United States Patent [19]
Baron et al.

[11] Patent Number: 5,275,309
[45] Date of Patent: Jan. 4, 1994

[54] ONE WAY VALVE WITH UNITARY VALVE ELEMENT

[75] Inventors: Richard D. Baron, Zephyrhills; Malcolm C. Smith, Dade City; Carl R. Spoeth, Jr., Bayonet Point; Valdemiro M. Quadros, Zephyrhills, all of Fla.

[73] Assignee: Lykes Pasco, Inc., Zephyrhills, Fla.

[21] Appl. No.: 885,050

[22] Filed: May 18, 1992

Related U.S. Application Data

[63] Continuation-in-part of Ser. No. 567,186, Aug. 14, 1990, Pat. No. 5,114,047.

[51] Int. Cl.$^5$ .............. B65D 37/00; B67D 5/56; F16K 15/14
[52] U.S. Cl. .............. 222/129.1; 137/843; 137/852; 137/528; 137/903; 222/212; 222/214
[58] Field of Search .............. 222/129.1, 207, 212, 222/214, 494–; 137/843, 852, 528, 903

[56] References Cited

U.S. PATENT DOCUMENTS

| | | | |
|---|---|---|---|
| 2,554,570 | 5/1951 | Harvey | 222/214 X |
| 2,912,999 | 11/1959 | Kersh | 137/843 X |
| 3,006,363 | 10/1961 | Jackson et al. | 137/843 |
| 3,403,696 | 10/1968 | Pynchon | 137/852 X |
| 4,632,151 | 12/1986 | Glover | 137/843 X |
| 5,114,047 | 5/1992 | Baron et al. | 222/214 X |

*Primary Examiner*—Kevin P. Shaver
*Attorney, Agent, or Firm*—Frijouf, Rust & Pyle

[57] ABSTRACT

An apparatus is disclosed for an improved one-way valve comprising a base for mounting in a chamber with a valve surface engaging with a sealing surface to close an input aperture of the chamber. A flexible web is interposed between the base and the valve surface for resiliently biasing the valve surface into engagement with the sealing surface thereby closing the input aperture. When a fluid pressure from the input aperture exceeds the resilient bias of the flexible web, the valve surface is displaced from the sealing surface for opening the input aperture to permit the flow of the liquid from the input aperture through the chamber into an output aperture. Upon a sufficient fluid pressure within the chamber, the valve surface engages with the sealing surface for closing the input aperture to inhibit the flow of fluid from the chamber into the input aperture.

19 Claims, 14 Drawing Sheets

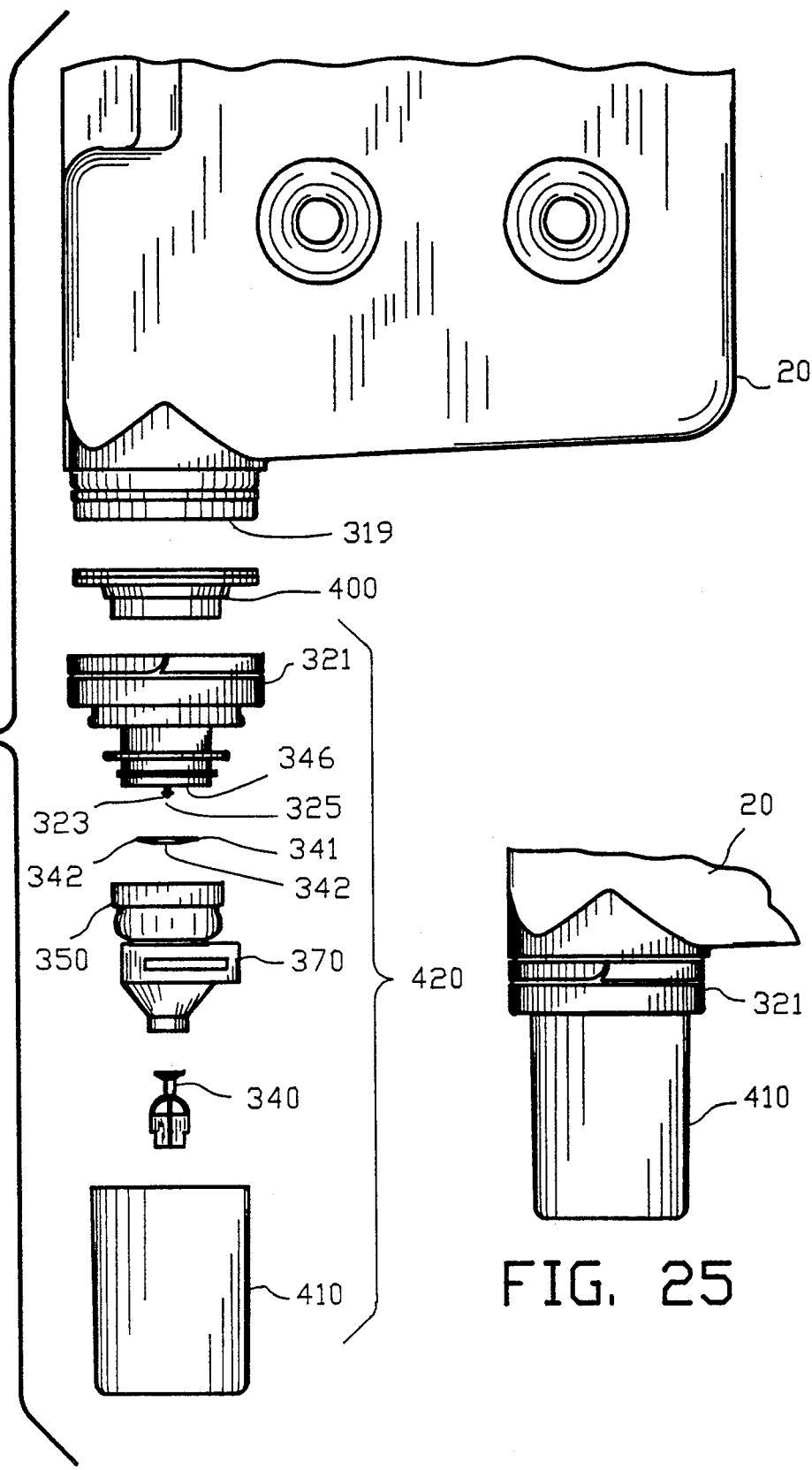

ONE WAY VALVE WITH UNITARY VALVE ELEMENT

CROSS-REFERENCE TO RELATED APPLICATIONS

This is a continuation-in-part of U.S. patent application Ser. No. 567,186 filed Aug. 14, 1990, now U.S. Pat. No. 5,114,047. All subject matter set forth in application Ser. No. 567,186 is hereby incorporated by reference into the present application as if fully set forth herein.

BACKGROUND OF THE INVENTION

1. Field of the Invention

This invention relates to a pump for dispensing a liquid from a terminal orifice. More particularly, the invention relates to a pump and a mixer for mixing a liquid concentrate and a liquid diluent for discharge from a terminal orifice.

2. Information Disclosure Statement

The prior art has known many types of pumping systems for pumping and dispensing a single or a plurality of liquids from a terminal orifice. Many of these devices relate to a system for mixing a liquid concentrate with a liquid concentrate in accordance with a pre-determined relationship and then dispensing the mixture from a terminal orifice. One important application for such a mixing and dispensing device is in the dispensing of liquid food products such as fruit juices, vegetable juices and the like. In many cases, fruit and vegetable juices such as orange juice, pineapple juice, grapefruit juice or tomato juice is stored in a frozen concentrate form for use at a later time. The frozen concentrate is then thawed and mixed with a water diluent to produce an end product equivalent to the original fruit or vegetable juice. In order to produce an end product which is equivalent in flavor and in consistency to the original fruit or vegetable juice, the concentrate and the water diluent must be accurately mixed in a predetermined volumetric relationship. Accordingly, the devices for mixing a liquid concentrate with a liquid concentrate must be accurate and reliable to produce an end product equivalent to the original fruit or vegetable juice.

When dealing with food products, other design problems are encountered when designing a pumping and a mixing device for a food dispensing device. First, the pumping and a mixing device must be readily accessible for cleaning the internal portions of the pump after each use. Second, the pump must be designed to pump accurate volumes of concentrate independent of the viscosity of the concentrate. It has been found that orange juice concentrate has different viscosities depending upon the temperature of the orange juice concentrate, the time of harvest of the crop as well as the specific type of orange juice harvested during the relatively long citrus harvesting season. As a consequence of these requirements peristaltic pumps were a popular choice in the prior art for pumping a liquid food concentrate. Peristaltic pumps not only performed well but were simple and low cost. However, the peristaltic pumps had the distinct disadvantage of a relatively large physical size as well as a limited variation in flow rate. Consequently, the flow rate of the liquid diluent had to be controlled in order to obtain different concentrate-diluent ratios for various fruit and vegetable juices. Further disadvantages of the peristaltic pump include a pulsating liquid flow, a noisy operation and a limited life of a deformable tubing in the peristaltic pump.

U.S Pat. No. 4,194,650 disclosed a novel dispensing device wherein the flow rate of a liquid diluent was kept at a constant rate and the flow rate of a liquid concentrate was varied by varying the speed of a pumping motor to obtain a desired volumetric ratio of liquid concentrate to liquid diluent. This dispensing device performed very satisfactorily and advanced the art of dispensing and mixing of a liquid concentrate with a liquid diluent.

In our prior U.S. patent application Ser. No. 567,186 filed Aug. 14, 1990, now U.S. Pat. No. 5,114,047, we disclosed an improved pump and mixing device for pumping a liquid concentrate from a container and for mixing the concentrate with a diluent. The improved pump and mixing device included a one-way valve for allowing the flow of the liquid in one direction only. The one-way valve of the improved pump and mixing device provided a reliable, accurate and cost effective device for operation with a pump and a mixing device.

Although our one-way valve provided a reliable, accurate and cost effective device for operation with a pump and a mixing device, the one-way valve also is useful for use independent of the pump and/or a mixing device. For example, the one way valve is useful for preventing backflow of the diluent into the water line to prevent the contamination of a diluent.

Therefore, it is a primary object of this invention to provide an improved one-way valve for use with the pump and mixing device and for use in fluid lines in general.

Another object of this invention is to provide an improved one-way valve that is accurate and reliable irrespective of the viscosity of the liquid.

Another object of this invention is to provide an improved one-way valve that is a reliable and inexpensive unit enabling the one way valve to be discarded after use.

Another object of this invention is to provide an improved one-way valve which cooperates with an intake aperture for enabling the flow of the liquid in only one direction through the fluid line.

Another object of this invention is to provide an improved one-way valve which reliably and inexpensively prevents backflow of liquids in a fluid line.

Another object of this invention is to provide an improved one-way valve which is an integrally molded one-piece unit.

Another object of this invention to provide an improved one-way valve which is constructed of a polymeric material such as a resilient thermoplastic polymer for improved flexibility and sanitary operation.

Another object of this invention to provide an improved one-way valve which converts a turbulent flow of a liquid from an aperture into a substantially laminar flow.

Another object of this invention to provide an improved one-way valve which is flexible for facilitating insertion and removal of the one-way valve from a chamber.

Another object of this invention to provide an improved one-way valve which is flexible for resiliently engaging the chamber to secure the one-way valve into a chamber.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved one-way valve for mounting in a chamber, the chamber having an input aperture, an output aperture, and a sealing surface disposed about the input aperture. The improved one-way valve comprises a base for mounting in the chamber and a valve surface for engaging with the sealing surface to close the input aperture. A flexible web is interposed between the base and the valve surface for resiliently biasing the valve surface into engagement with the sealing surface thereby closing the input aperture. When a fluid pressure from the input aperture exceeds the resilient bias of the flexible web, the valve surface is displaced from the sealing surface for opening the input aperture to permit the flow of the liquid from the input aperture through the chamber into the output aperture. Upon a sufficient fluid pressure within the chamber, the valve surface engages with the sealing surface for closing the input aperture to inhibit the flow of fluid from the chamber into the input aperture.

In one embodiment of the invention, the valve surface comprises a resilient truncated conical member having a first conical end and a second conical end. A substantially rigid annular member is secured to the second conical end of the resilient truncated conical member. The flexible web is secured to the annular member for enabling the resilient truncated conical member and the substantially rigid annular member to move in unison upon the flexing of the flexible web. The base comprises a first and a second cross-member for supporting the base within the chamber. The first and second cross-members define a plurality of sectors therebetween for enabling the flow of fluid through the plurality of sectors, and preferably for converting the flow of the liquid from the input aperture into the chamber into a substantially laminar flow upon discharge from the output aperture. A shaft is integrally formed with the first and second cross-members for supporting the flexible web on the base. Preferably, the flexible web is integrally molded with the resilient truncated conical member and with the base.

In another embodiment of the invention, the improved one-way valve cooperates with a mixing chamber having an input aperture and an output aperture with a sealing surface disposed about the input aperture. A diluent port is defined in the mixing chamber and interposed between the input aperture and the output aperture. The base is mounted in the chamber with a shaft integrally formed therewith. A valve surface engages with the sealing surface to close the input aperture. A flexible web is interposed between the shaft and the valve surface for resiliently biasing the valve surface into engagement with the sealing surface for closing the input aperture. The liquid is introduced into the mixing chamber through the input aperture. The valve surface is displaced from the sealing surface for opening the input aperture when a pressure from the liquid entering the input aperture is greater than the resilient bias of the flexible web for permitting the flow of the liquid from the input aperture into the mixing chamber. The liquid diluent is introduced into the mixing chamber through the diluent port. Preferably, the input aperture is axially aligned with the output aperture and the diluent port is perpendicular to the axial alignment of the input and output apertures, thus enabling the liquid diluent to flow direction perpendicular to the flow direction of the liquid for mixing the liquid diluent with the liquid. The valve surface engages with the sealing surface disposed about the input aperture for closing the input aperture when the pressure from the liquid is less than the pressure from the resilient biasing of the flexible web. The liquid entering the input aperture mixes with the liquid diluent being introduced through the diluent port for discharge from the output aperture.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 24 is an exploded view of the third embodiment of the pump of FIGS. 21-23A and the container;

FIG. 25 is an assembled view of the third embodiment of the pump of FIGS. 21-23A and the container;

Throughout the specification and drawings, similar reference characters refer to similar parts throughout the several figures of the drawings.

DETAILED DISCUSSION

Figure 1:
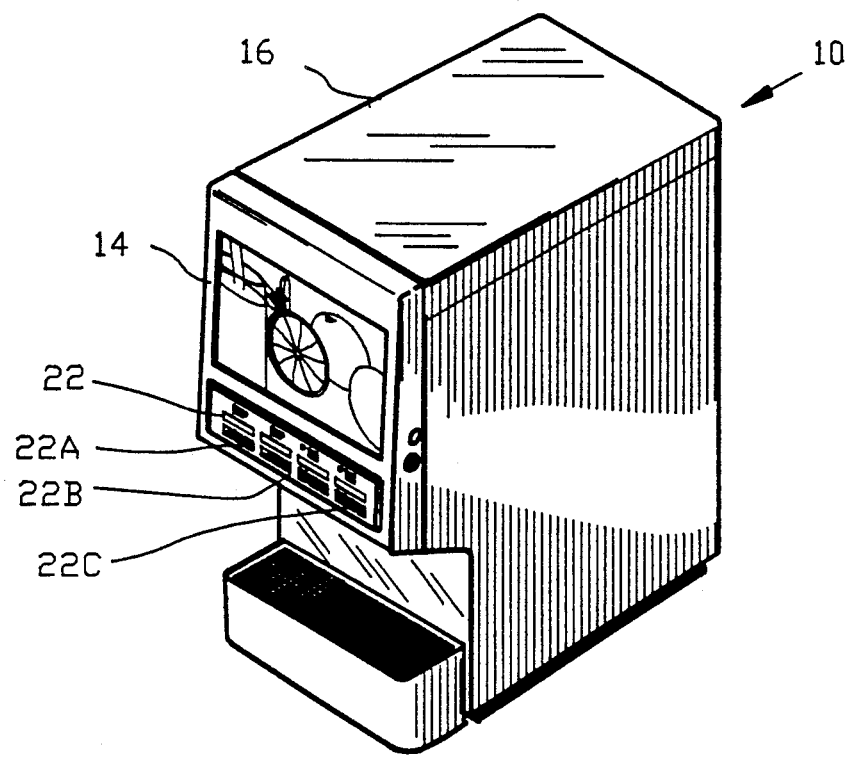
FIG. 1 is a isometric view of a dispenser device incorporating present invention.
Figure 2:
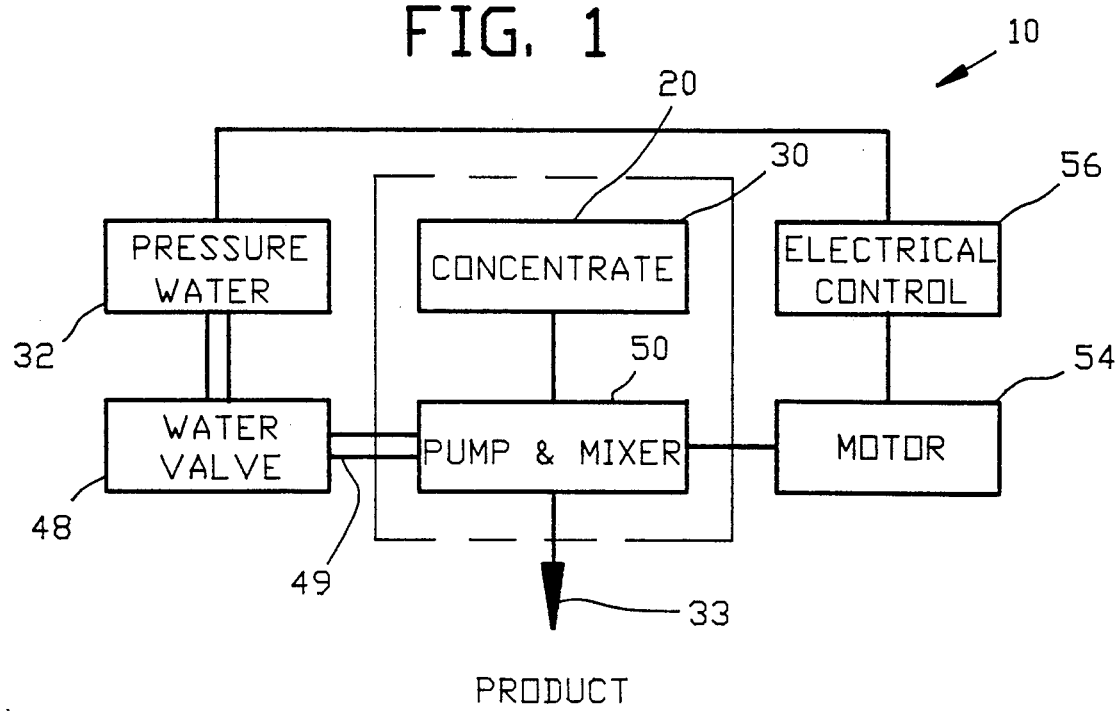
FIG. 2 is a block diagram illustrating the mechanism of the dispenser device of FIG. 1.
Figure 3:
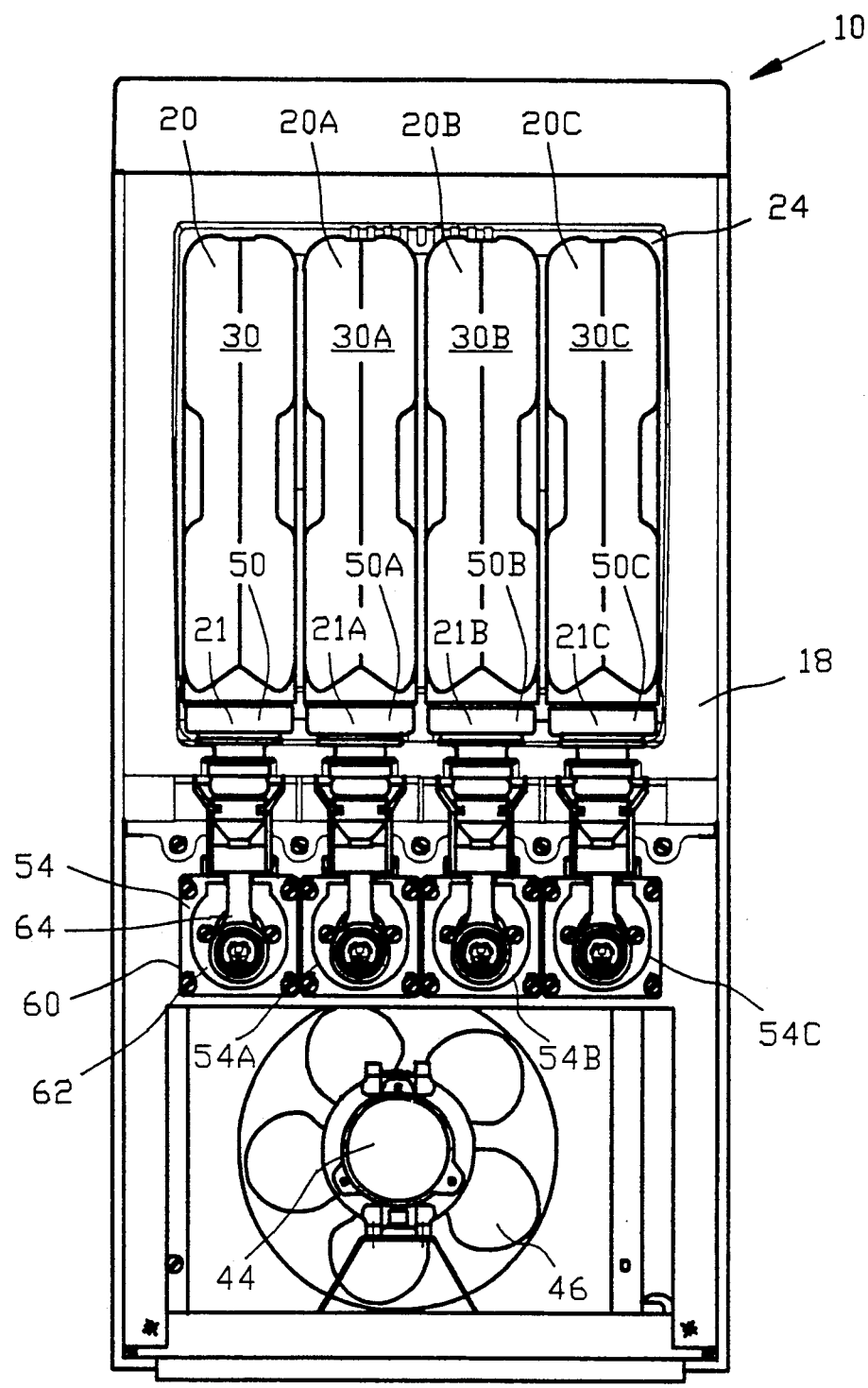
FIG. 3 is a front view of the interior of the dispenser device of FIG. 1.
Figure 4:
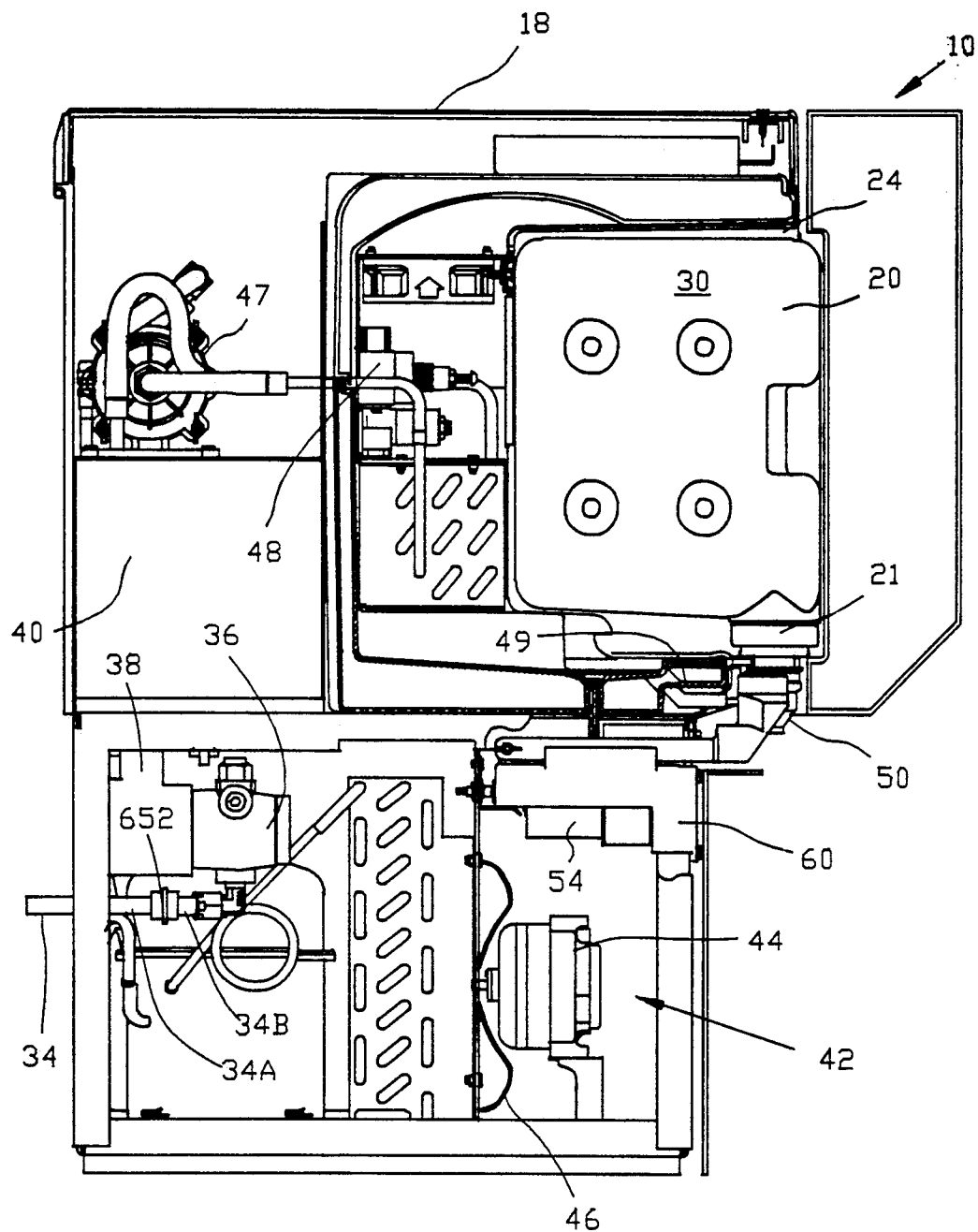
FIG. 4 is a side view of the interior of the dispenser device of FIG. 1.

FIG. 1 is an isometric view of a dispenser device 10 for pumping a liquid into cup or other vessel (not shown). FIG. 2 is a block diagram illustrating the mechanism of the dispenser device 10. FIGS. 3 and 4 illustrate a front view and a side view of the interior of the dispensing device 10 of FIG. 1 with a front cover 14 and a side cover 16 being removed from a main frame 18 of the dispenser device 10. The dispenser 10 is shown being able to pump four separate liquids concentrates from four separate containers 20, 20A, 20B and 20C having attached container caps 21, 21A, 21B and 21C upon activation of operator controls 22, 22A, 22B and 22C but it should be understood that the present invention may be incorporated into a dispenser device 10 for pumping a single liquid concentrate from a single container 20. The containers 20, 20A, 20B and 20C and the attached container caps 21, 21A, 21B and 21C are removably received within a refrigeration compartment 24 and are inserted within the refrigeration compartment 24 by inserting the containers 20, 20A, 20B and 20C through the front of the dispensing device 10 when the front cover 14 is opened or removed from the main frame 18 of the dispenser device 10. Preferably, the front cover 14 is pivotably mounted to the main frame 18. Each of the containers 20, 20A, 20B and 20C store a concentrate 30, 30A, 30B and 30C for mixing with a liquid diluent 32 for providing an end product 33.

The liquid diluent 32 such as water under pressure from a conduit 34 enter through a liquid pressure regulator 36 into a valve 38. An input valve 38 as best shown in FIG. 4, controls the flow of the liquid diluent under pressure into a liquid diluent reservoir 40. A refrigeration unit 42 including a motor 44, a compressor 45 and a fan 46, refrigerates the liquid diluent 32 within the reservoir 40. The liquid diluent 32 within the reservoir 40 is circulated by a circulation pump 47 between the refrigerated reservoir 40 and the refrigeration compartment 24 for maintaining the temperature of the liquid concentrates 30, 30A, 30B and 30C at a proper chilled temperature. A liquid diluent flow control valve 48 controls the flow of the liquid diluent 32 from the reservoir 40 to pumping and mixing devices 50, 50A, 50B and 50C through flexible conduits such as flexible conduit 49. The concentrates 30, 30A. 30B and 30C from the containers 20, 20A, 20B and 20C are received by the pumping and mixing devices 50, 50A, 50B and 50C which are operated by motive means including pumping motors 54, 54A, 54B and 54C. An electrical control 56 operates of the dispenser device 10 in response to the operator controls 22, 22A, 22B and 22C. Upon activation of one of the operator controls 22, 22A, 22B and 22C, the electrical control 56 energizes flow control valve 48 and a selected one of the pumping motors 54, 54A, 54B and 54C for mixing the liquid diluent 32 with a selected one of the concentrates 30, 30A, 30B and 30C from the containers 20, 20A, 20B and 20C to produce an end product 33. The control means 56 simultaneously energizes the liquid flow control valve 48 and the motor 54 for mixing a selected amount of the liquid concentrate 30 with a selected amount of the liquid diluent 32. The electrical control 56 is capable of varying the speed of the pumping motors 54, 54A, 54B and 54C for varying the flow rate of the concentrates 30, 30A, 30B and 30C from the containers 20, 20A, 20B and 20C. The flow rate of the liquid diluent 32 is maintained at a constant flow rate by the liquid pressure regulator 36. The flow rate of the liquid concentrates 30, 30A, 30B and 30C may be varied by changing the speed of the pumping motors 54, 54A, 54B and 54C. Accordingly, a desired volumetric ratio for each of the liquid concentrates 30, 30A, 30B and 30C to liquid diluent 32 may be established for each of the liquid concentrates 30, 30A, 30B and 30C in a manner similar to the system set forth in U.S. Pat. No. 4,194,650. Furthermore, different volumetric ratios of liquid concentrate to liquid diluent 32 for each of the concentrates 30, 30A, 30B and 30C may be provided by establishing different pumping rates through different pumping speeds of the pumping motors 54, 54A, 54B and 54C.

Figure 5:
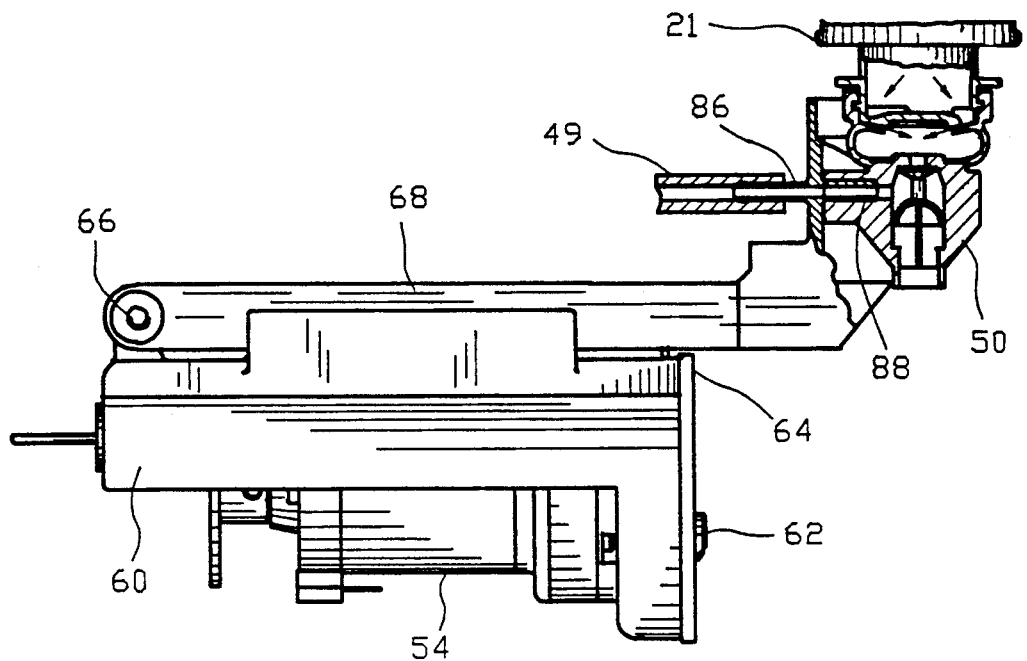
FIG. 5 is an enlarged view of the dispensing mechanism of the dispenser device with a pump shown in a first position.
Figure 6:
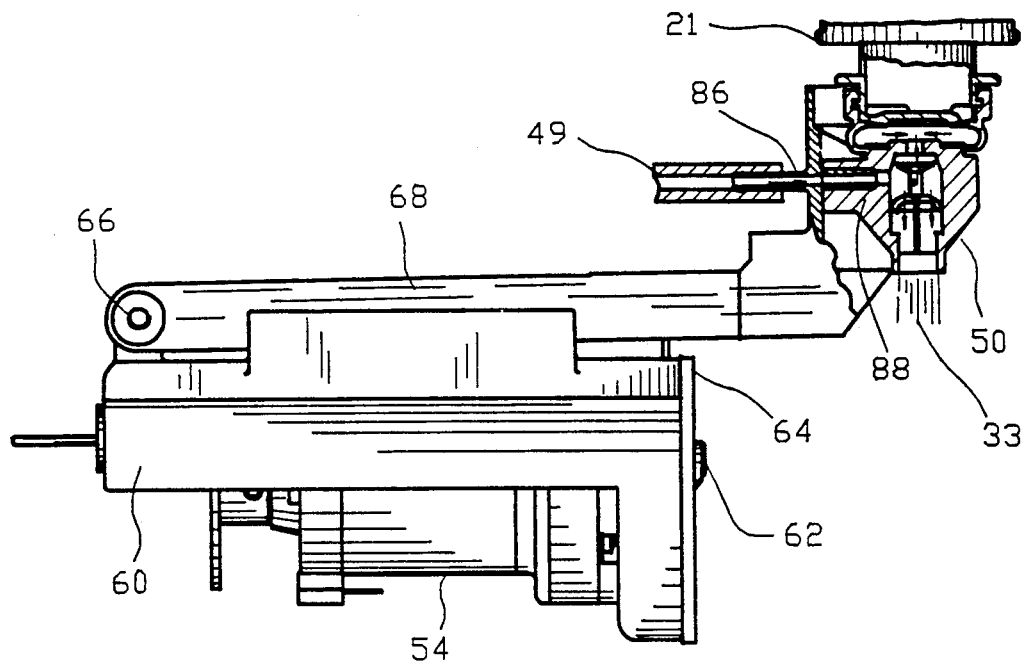
FIG. 6 is an enlarged view of the dispensing mechanism of the dispenser device with the pump shown in a second position.

FIGS. 5 and 6 illustrate enlarged views of the pumping and mixing device 50 and the motive means including the pumping motor 54 which is identical to the pumping and mixing devices 50A, 50B and 50C and the pumping motors 54A, 54B and 54C. FIG. 5 illustrates the pumping and mixing device 50 in a first position whereas FIG. 6 illustrates the pumping and mixing device 50 in a second position. The motive means includes the pumping motor 54 received within a motor frame 60 which motor frame 60 is secured to the main frame 18. As best shown in FIG. 3, the pumping motor 54 includes an eccentric 62 for reciprocating a driving arm 64. The motor frame 60 as illustrates in FIGS. 5 and 6 includes a pivot 66 for pivotably mounting a pivot arm 68. The driving arm 64 pivots the pivot arm 68 about pivot 66 between the first position shown in FIG. 5 and the second position shown in FIG. 6.

Figure 7:
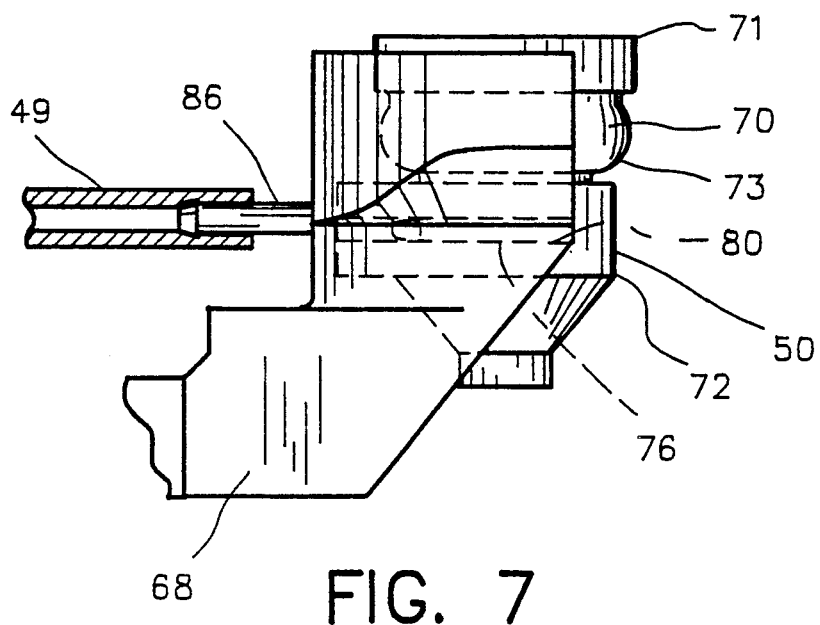
FIG. 7 is a side view of a portion of the dispensing mechanism shown in FIGS. 5 and 6 illustrating the interconnection of the dispensing mechanism with the pump.
Figure 8:
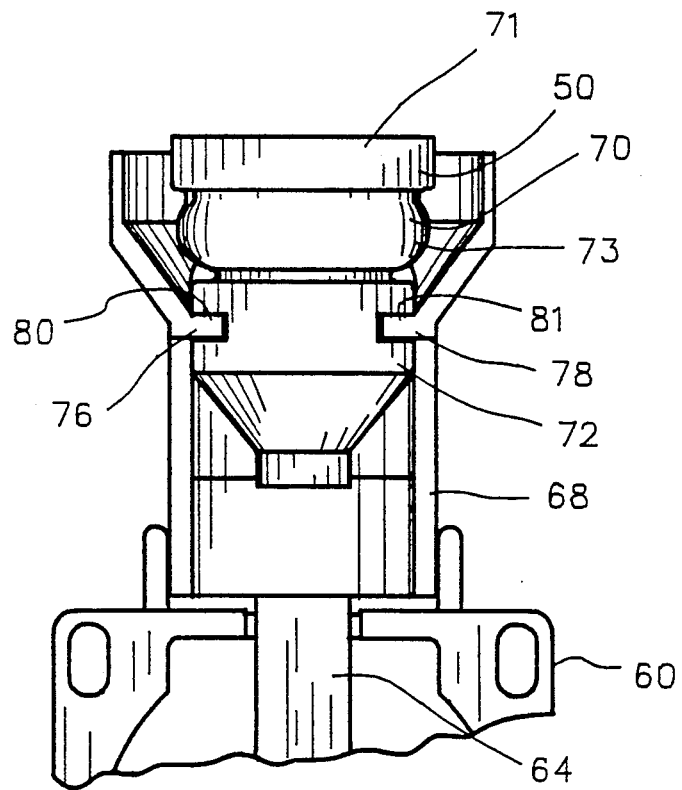
FIG. 8 is a front view of FIG. 7.
Figure 9:
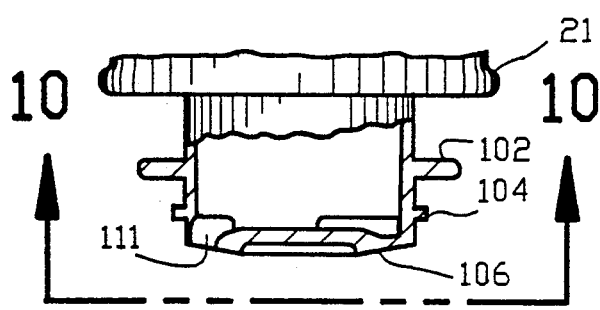
FIG. 9 is an enlarged partial view of a container of the dispenser device illustrating the container aperture.
Figure 10:
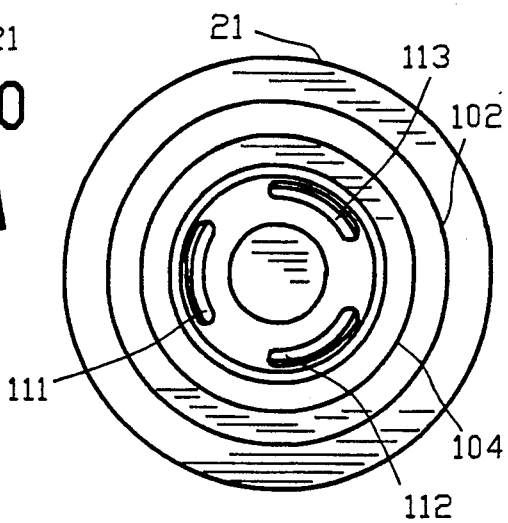
FIG. 10 is a view along line 10—10 of FIG. 9.
Figure 11:
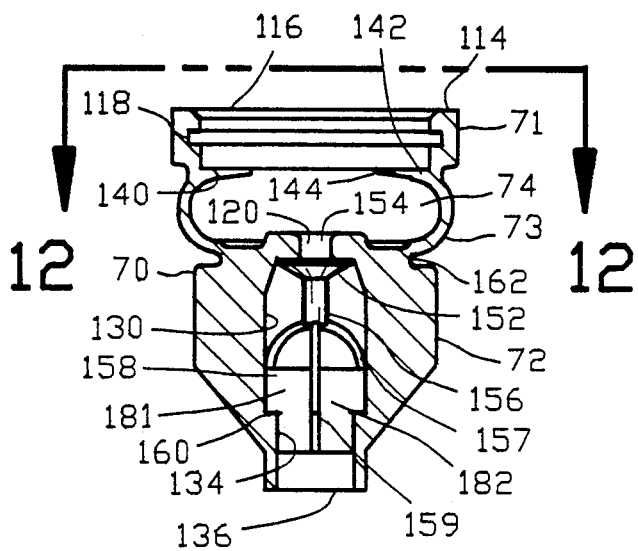
FIG. 11 is an enlarged sectional view of a first embodiment of a pump for the dispenser device.
Figure 12:
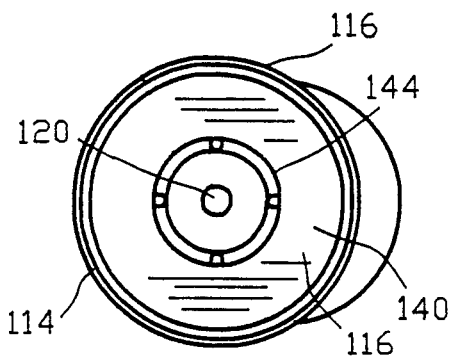
FIG. 12 is a view along line 12—12 of FIG. 11.

FIGS. 7 and 8 are side and front views of a portion of the pumping and mixing device 50 and the pumping motor 54. The pumping and mixing device 50 comprises a body member 70 having an input body portion 71 and an output body portion 72 with flexible wall means 73 interconnecting the input body portion 71 and the output body portion 72. The input body portion 71 of the pumping and mixing device 50 is secured to the container cap 21 of the container 20 which container 20 is fixed relative to the main frame 18. The output body portion 72 includes coupling means integrally formed in the output body portion 72 for mechanically coupling the output body portion 72 to the motor 54. As best shown in FIGS. 7 and 8, the pivot arm 68 includes plural opposed fingers 76 and 78 which are received within recesses 80 and 82 the output body portion 72 pumping and mixing device 50.

When the pumping motor 54 rotates, the pivot arm 68 moves the output body portion 72 relative to the input body portion 71 of the pumping and mixing device 50 between the first position shown in FIG. 5 and the second position shown in FIG. 6. The flexible wall means 73 defines a pumping chamber 74 for pumping the liquid concentrate 30 from the container 20 to mix with the liquid diluent 32 when the output body portion 72 is moved between the first and second position as will be described in greater detail hereinafter. The flexible conduit 49 provides a fluid coupling between the stationary flow control valve 48 secured to the main frame 18 and the reciprocating output body portion 72 of the pumping and mixing device 50.

In this embodiment, the plural opposed fingers 76 and 78 the pivot arm 68 are received within recesses 80 and 82 in the output body portion 72 of the pumping and mixing device 50 when the container 20 and the container cap 21 are inserted within a refrigerated compartment 24 of the dispensing device 10. The pivot arm 68 also includes a tubular member 86 which is connected to the flexible conduit 49 receiving the flow of the liquid diluent 32 from the reservoir 40. The tubular member 86 of the pivot arm 68 is received within a mixing port 88 defined in the output body portion 72 of the pumping and mixing device 50 when the container 20 and the container cap 21 are inserted within the refrigerated compartment 24 of the dispensing device 10 Accordingly, the plural opposed fingers 76 and 78 and the recesses 80 and 82 mechanically couple the output body portion 72 of the pumping and mixing device 50 to the pivot arm 68 whereas the tubular member 86 and the mixing port 88 fluidly couple the pumping and mixing device 50 to the pivot arm 68 when the container 20 and the container cap 21 are inserted within a refrigerated compartment 24 of the dispensing device 10.

FIGS. 9-14 illustrate enlarged partial views of the container 10 in combination with the pumping and mixing device 50. The container cap 21 has an annular shoulder 102 and an annular projection 104. A face surface 106 defines container aperture means shown as plural arcuate apertures 111, 112 and 113 for discharging the concentrate 30 internal the container 20. The pumping and mixing device 50 of the present invention including the input body portion 71, the output body portion 72 and the flexible wall means 73 is preferably constructed from a unitary flexible polymeric material such as a thermoplastic elastomer or a thermoplastic rubber or any other suitable material.

The input body portion 71 of the pumping and mixing device 50 includes a terminal end 114 defining an input aperture 116 communicating with the pumping chamber 74. An annular recess 118 is provided in the input aperture 116 for resiliently receiving the annular projection 104 of the container cap 21 for securing the pumping and mixing device 50 to the container cap 21. The plural arcuate apertures 111, 112 and 113 of the container cap 21 in combination with the input aperture 116 of the pumping and mixing device 50 enable the concentrate 30 from the container 20 to flow through the arcuate apertures 111, 112 and 113 into the input aperture 116 of the input body portion 71 and into the pumping chamber 74.

The output body portion 72 defines an output aperture 120 communicating with the pumping chamber 74. The flexible wall 73 interconnecting the input body portion 71 with the output body portion 72 is relatively thin for enabling the output body portion 72 to move independently of the input body portion 71 for changing the volume of the pumping chamber 74.

A mixing chamber 130 is defined in the output body portion 72 of the body member 70 and communicates with the output aperture 120 for receiving the concentrate liquid 30 from the pumping chamber 74. A terminal passage 134 is integrally formed in the output body portion 72 and communicates with the mixing chamber 130. The terminal passage 134 defines a terminal orifice 136 for discharging the mixture 33 of the concentrate liquid 30 and the diluent liquid 32.

An input one-way valve means 140 is disposed in the input aperture 116 of the input body portion 71 for permitting the flow of liquid concentrate 30 only from the plural arcuate apertures 111, 112 and 113 to the pumping chamber 74 of the body member 70. The input one-way valve means 140 is integrally formed with the body member 70 and extends from a base 142 proximate the interface of the input body portion 71 and the flexible wall portion 73 to a distal end 144. As it can be clearly seen in FIGS. 13 and 14, the input one-way valve means 140 engages an overlaid portion 146 the face surface 106 of the container cap 21 to overlays the plural arcuate apertures 111, 112 and 113. Since the input one-way valve means 140 is integrally fabricated from the same resilient material as the body portion 70 and since the input one-way valve means 140 tapers from the base 142 to the distal end 144, the input one-way valve means 140 resiliently engages the overlaid portion 146 of the face surface 106 of the container cap 21.

Figure 13:
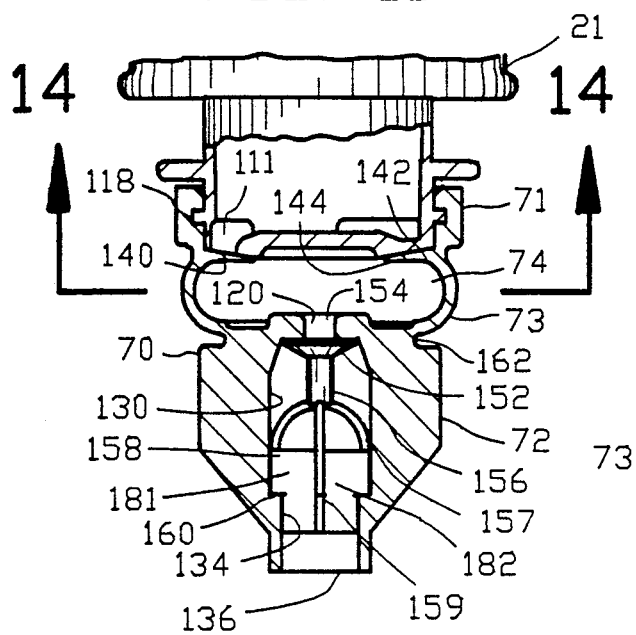
FIG. 13 is an enlarged partial view of the first embodiment of a pump of FIGS. 11 and 12 coupled to the container shown in FIGS. 9 and 10.
Figure 14:
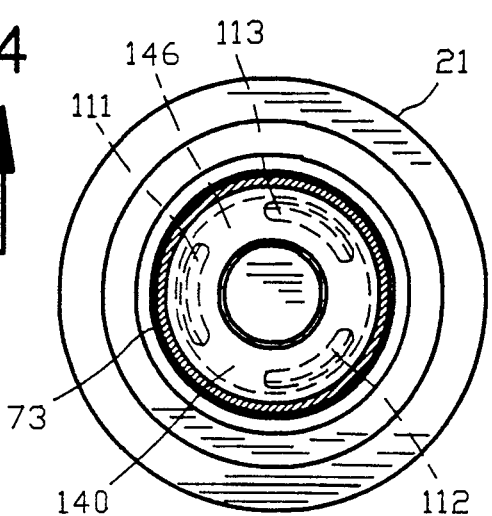
FIG. 14 is a sectional view along line 14—14 of FIG. 13.

When a fluid pressure is greater in the arcuate apertures 111, 112 and 113 than the fluid pressure in the pumping chamber 74, then the input one-way valve means 140 will flex downwardly in FIG. 13 from the overlaid portion 146 permitting the flow of concentrate 30 from the arcuate apertures 111, 112 and 113 into the pumping chamber 74. When a fluid pressure is less in the arcuate apertures 111, 112 and 113 than the fluid pressure in the pumping chamber 74, then the input one-way valve means 140 will engage the overlaid portion 146 as shown in FIG. 13 to prevent the flow of the concentrate 30 from the arcuate apertures 111, 112 and 113 into the pumping chamber 74.

An output one-way valve means 152 is disposed within the mixing chamber 130 and cooperates with the output aperture 120 of the output body portion 72 for permitting the flow of liquid concentrate 30 only from the pumping chamber 74 of the body member 70. The output one-way valve means 152 comprises a valve surface 154 affixed to a shaft 156 which is supported by a flexible web 157. The flexible web 157 is integrally affixed to cross members 158 and 159. The base of the cross members 158 and 159 engage a shoulder 160 defined in the mixing chamber 130 to retain the output one-way valve means 152 within the mixing chamber 130 such that the valve surface 154 engages an upper surface 162 of the mixing chamber 130 to overlay the output aperture 120. Preferably, the output one-way valve means 152 including the valve surface 154, shaft 156, flexible web 157 and the cross members 158 and 159 are integrally molded from a polymeric material such as silicone or any other suitable material.

When a fluid pressure is greater in the pumping chamber 74 than the fluid pressure in the mixing chamber 130, then the flexible web 157 will flex downwardly in FIG. 13 from the overlaid portion 146 permitting the flow of the concentrate 30 from the pumping chamber 74 into the mixing chamber 130. When a fluid pressure is less in the pumping chamber 74 than the fluid pressure in the mixing chamber 130, then the valve surface 154 will remain in the overlaying position shown in FIG. 13 and prevent the flow of the concentrate 30 from the pumping chamber 74 into the mixing chamber 130.

Figures 15, 15A:
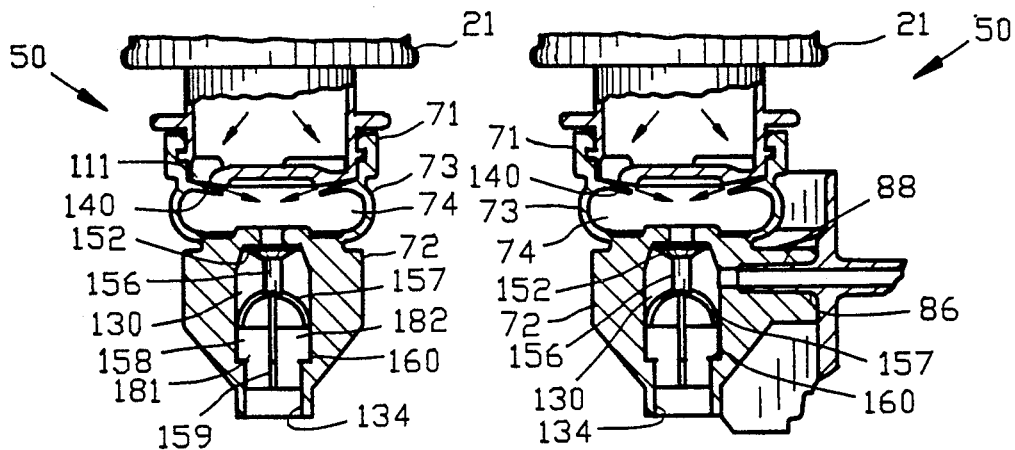
FIG. 15 is a front sectional view of a first embodiment of the pump with the pump being shown in a first position.
FIG. 15A is an side sectional of FIG. 15.
Figures 16, 16A:
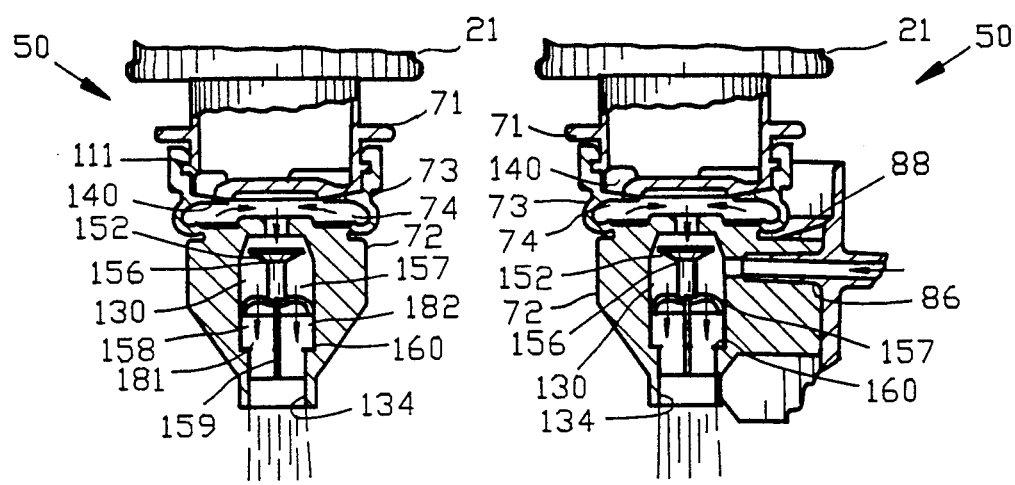
FIG. 16 is a front sectional view of the first embodiment of the pump with the pump being shown in a second position.
FIG. 16A is an side sectional of FIG. 16.
Figures 17, 17A:
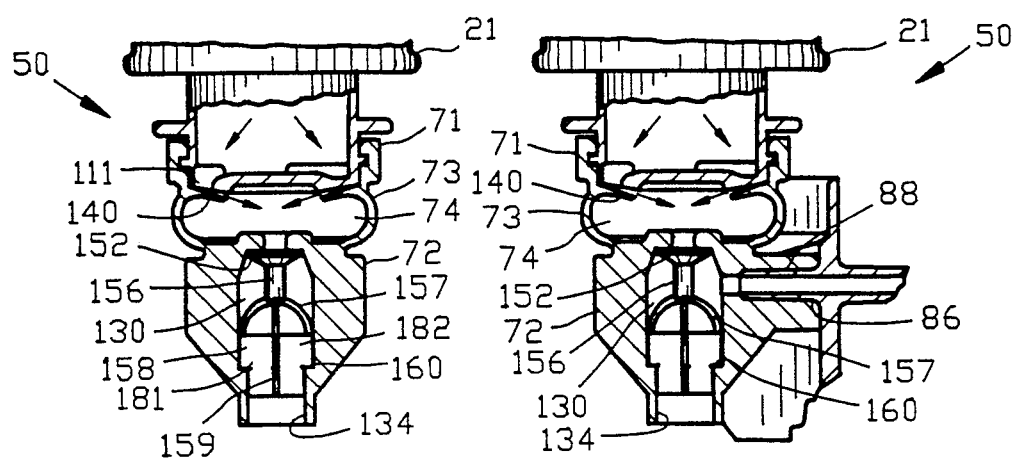
FIG. 17 is a front sectional view of the first embodiment of the pump with the pump shown being returned to the first position.
FIG. 17A is an side sectional of FIG. 17.

FIGS. 15 and 15A are sectional views of the first embodiment of the pumping and mixing device 50 with the pump and mixing device 50 being shown in a first position. FIGS. 16 and 16A illustrate the first embodiment of the pump and mixing device 50 in a second position whereas FIGS. 17 and 17A illustrate the first embodiment of the pump and mixing device 50 returned to the first position. The motive means including motor 54 reciprocates the output body portion 72 relative to the input body portion 71 between the first and the second position for causing the liquid concentrate 30 to flow from the arcuate apertures 111, 112 and 113 of the container cap 21 through the input one-way valve means 140 into the pumping chamber 74 when the output body portion 72 is move into the first position and for causing the liquid concentrate 30 to flow from the pumping chamber 74 through the output one-way valve means 152 when the output body portion 72 is move into the second position.

When the motive means including motor 54 reciprocates the output body portion 72 from the second position shown in FIGS. 16 and 16A to the first position shown in FIGS. 15 and 15A, the volume of the pumping chamber 74 expands thereby reducing the pressure internal the pumping chamber 74 such that atmospheric pressure will move the valve surface 154 of the output one-way valve 152 into the overlaying position shown in FIGS. 15 and 15A thus closing the output one way valve 152. Since the fluid pressure is now greater in the arcuate apertures 111, 112 and 113 than the fluid pressure internal the pumping chamber 74, the input one-way valve means 140 will flex downwardly as shown in FIGS. 15 and 15A to open the input one-way valve means 140 and to permit the flow of liquid concentrate 30 from the arcuate apertures 111, 112 and 113 into the pumping chamber 74.

When the motive means including motor 54 reciprocates the output body portion 72 from the first position shown in FIGS. 15 and 15A into the second position shown in FIGS. 16 and 16A, the volume of the pumping chamber 74 contracts thereby increasing the pressure internal the pumping chamber 74 such that the input one-way valve means 140 will move into the overlaying position shown in FIGS. 16 and 16A thus closing input one-way valve means 140 and preventing the further flow of liquid concentrate 30 from the arcuate apertures 111, 112 and 113 into the pumping chamber 74. Since the fluid pressure internal the pumping chamber 74 is now greater than the atmospheric pressure, the output one way valve 152 is displaced from the overlaying position shown in FIGS. 15 and 15A into the open position shown in FIGS. 16 and 16A thus permitting the flow of liquid concentrate 30 from the pumping chamber 74 into the mixing chamber 130.

When the motive means including motor 54 reciprocates the output body portion 72 from the second position shown in FIGS. 16 and 16A to the first position shown in FIGS. 17 and 17A, the volume of the pumping chamber 74 again expands thereby reducing the pressure internal the pumping chamber 74 to close the output one way valve 152. The greater fluid pressure in the arcuate apertures 111, 112 and 113 opens the input one-way valve means 140 to permit the flow of liquid concentrate 30 from the arcuate apertures 111, 112 and 113 into the pumping chamber 74. Continued reciprocation the output body portion 72 relative to the input body portion 71 between the first and the second position will continuously cause the liquid concentrate 30 to flow from the arcuate apertures 111, 112 and 113 of the container cap 21 through the pumping chamber 74 and into the mixing chamber 130 as heretofore described.

FIGS. 15A, 16A and 17A further illustrate the mixing port 88 defined in the body member 70 for introducing the diluent liquid 32 into the mixing chamber 130. The mixing port 88 resiliently receives the tubular member 86 of the pivot arm 68 for providing a fluid tight seal. The liquid diluent 32 enters the mixing chamber 130 under pressure controlled by valve 48. The liquid diluent 32 enters the mixing chamber 130 at a right angle to the flow of the liquid concentrate 30 and proximate to the shaft 156 causing a turbulence for facilitating the mixing of the liquid concentrate 30 with the liquid diluent 32.

Furthermore, the reciprocation of the mixing chamber 130 concurrently with the reciprocation of the output body member 72 between the first and the second position assists in the mixing of the liquid diluent 32 with the liquid concentrate 30.

Figure 17B:
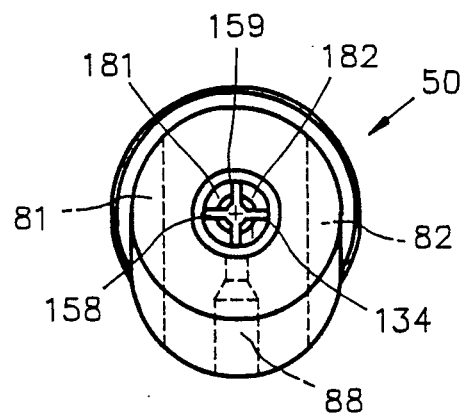
FIG. 17B is a partial bottom view of FIG. 17.
Figure 29:
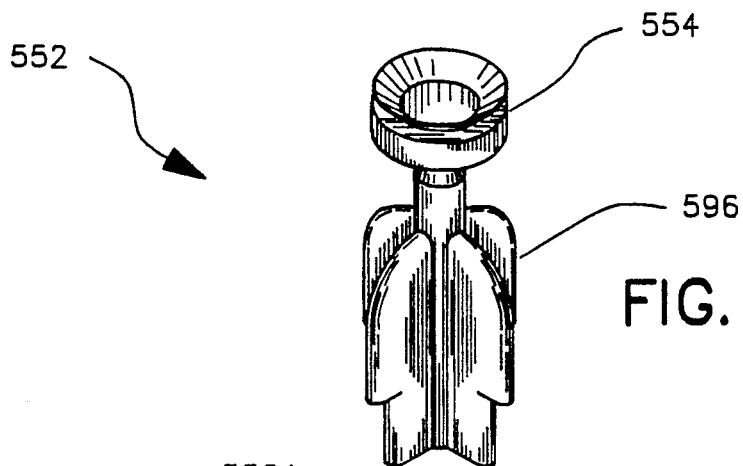
FIG. 29 is an enlarged isometric view of an improved one-way valve of the present invention.
Figure 30:
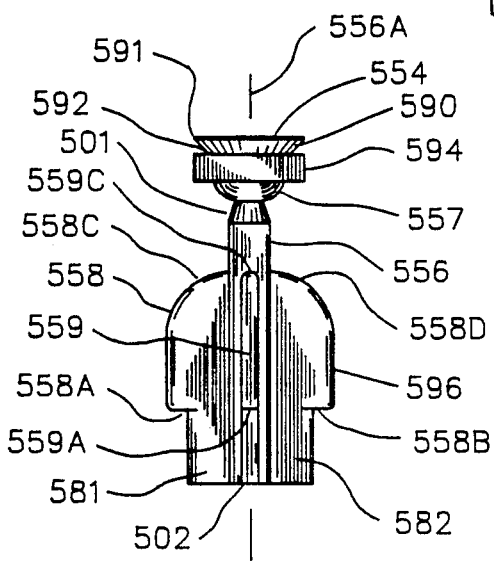
FIG. 30 is a front elevational view of the one-way valve of FIG. 29.
Figure 31:
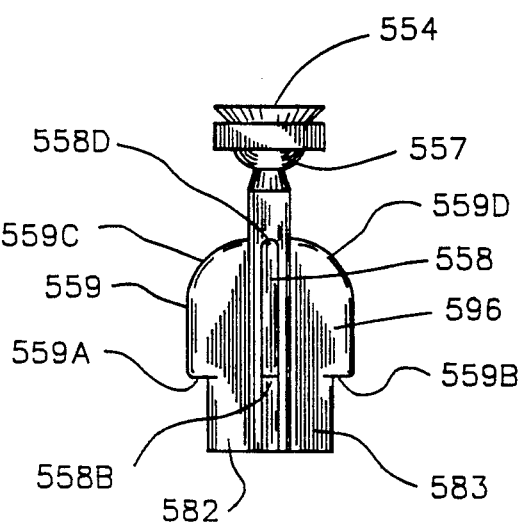
FIG. 31 is a side view of FIG. 30.
Figure 32:
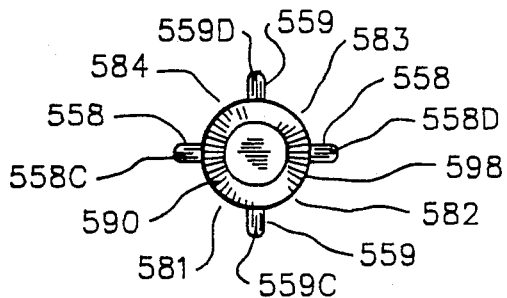
FIG. 32 is a top view of FIG. 30.
Figure 33:
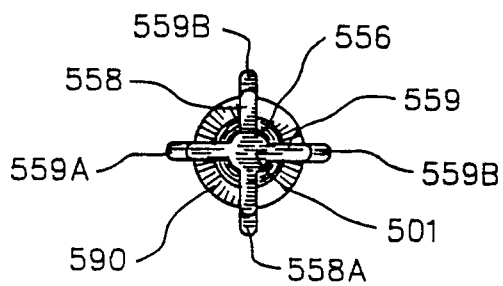
FIG. 33 is a bottom view of FIG. 30.

The liquid diluent 32 and liquid concentrate 30 flows through the web 157 and enters sectors including sectors 181 and 182 defined by the cross members 158 and 159. The sectors including sectors 181 and 182, as also shown in FIG. 17B, modify the turbulent flow of the mixed liquid diluent 32 and liquid concentrate 30 proximate the shaft 156 into a substanstially laminar flow from the terminal orifice 136.

Figures 18, 18A:
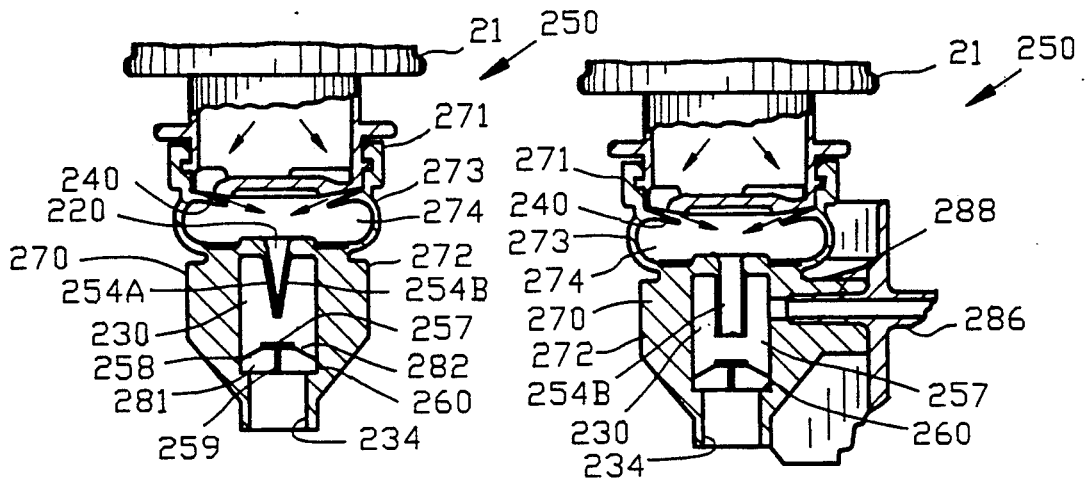
FIG. 18 is a front sectional view of a second embodiment of the pump with the pump being shown in a first position.
FIG. 18A is an side sectional of FIG. 18.
Figures 19, 19A:
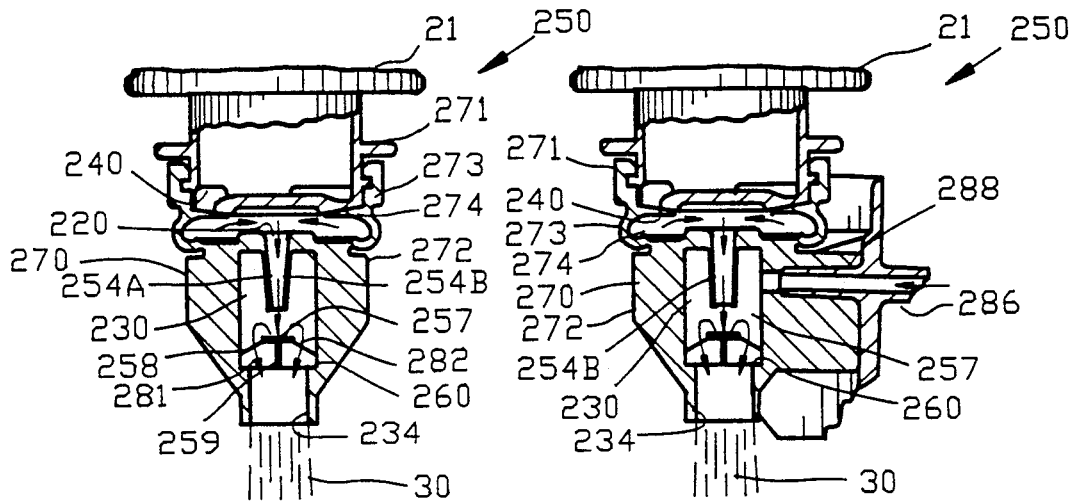
FIG. 19 is a front sectional view of the second embodiment of the pump with the pump being shown in a second position.
FIG. 19A is an side sectional of FIG. 19.
Figures 20, 20A:
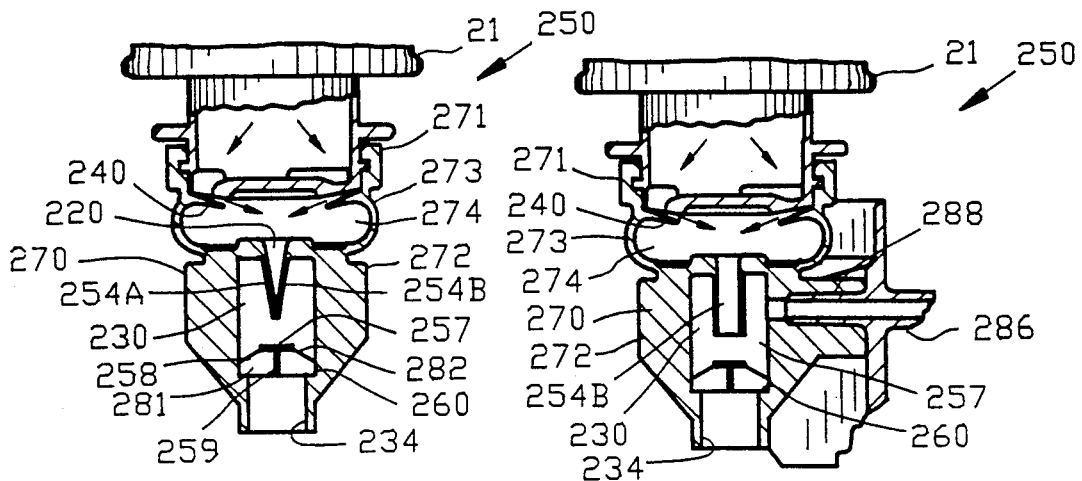
FIG. 20 is a front sectional view of the second embodiment of the pump with the pump being shown returned to the first position.
FIG. 20A is an side sectional of FIG. 20.

FIGS. 18 and 18A are sectional views of a second embodiment of the pumping and mixing device 250 with the pump and mixing device 250 being shown in a first position. FIGS. 19 and 19A illustrate the second embodiment of the pump and mixing device 250 in a second position whereas FIGS. 20 and 20A illustrate the second embodiment of the pump and mixing device 250 returned to the first position. In this embodiment, the input body portion 271 including the input one-way valve means 240 and the flexible wall 273 of the pumping and mixing device 250 are identical to the input body portion 71, the input one-way valve means 140 and the flexible wall 73 of the pumping and mixing device 50 illustrated in FIGS. 15–17. In addition, the output body portion 272 including the mixing chamber 230 and the terminal passage 234 are identical to the output body portion 72, the mixing chamber 130 and the terminal passage 134 of the pumping and mixing device 50 illustrated in FIGS. 15–17.

In this embodiment, the output one-way valve means 250 is integrally formed within the mixing chamber 230 and cooperates with the output aperture 220 of the output body portion 272 for permitting the flow of liquid concentrate 30 only from the pumping chamber 274 of the body member 270. The output one-way valve means 252 comprises a sphincter valve having a first and a second flexible valve surface 254A and 254B which are biased into engagement with one another as shown in FIGS. 18 and 18A. When the fluid pressure in the pumping chamber 274 is greater than the fluid pressure in the mixing chamber 230, then the first and second flexible valve surface 254A and 254B separate from one another permitting the flow of fluid from the pumping chamber 274 into the mixing chamber 230. When a fluid pressure in the pumping chamber 274 is less than the fluid pressure in the mixing chamber 230, then the valve surfaces 254A and 254B will remain in the biased engagement position to prevent the flow of fluid from the mixing chamber 230 into the pumping chamber 274.

A horizontal surface member 257 supported cross members 258 and 259 is disposed in the mixing chamber 230. A base of each of the cross members 258 and 259 engage a shoulder 260 defined in the mixing chamber 230 to retain the horizontal surface member within the mixing chamber 230. The cross members 258 and 259 define sectors including sectors 281 and 282 in a manner similar to FIGS. 15–17.

When the motive means including motor 54 reciprocates the output body portion 272 from the second position shown in FIGS. 19 and 19A to the first position shown in FIGS. 18 and 18A, the volume of the pumping chamber 274 expands thereby reducing the pressure internal the pumping chamber 274 such that the valve surface 254A and 254B of the output one way valve 252 will move into engagement with one another as shown in FIGS. 18 and 18A thus closing the output one way valve 252. Since the fluid pressure in the arcuate apertures 111, 112 and 113 is now greater than the fluid pressure internal the pumping chamber 274, the input one-way valve means 240 will flex downwardly as shown in FIGS. 18 and 18A to open the input one-way valve means 240 and to permit the flow of liquid concentrate 30 from the arcuate apertures 111, 112 and 113 into the pumping chamber 274.

When the motive means including motor 54 reciprocates the output body portion 272 from the first position shown in FIGS. 18 and 18A into the second position shown in FIGS. 19 and 19A, the volume of the pumping chamber 274 contracts thereby increasing the pressure internal the pumping chamber 274 such that the input one-way valve means 240 will move into the overlaying position shown in FIGS. 19 and 19A thus closing input one-way valve means 240 and preventing the further flow of liquid concentrate 30 from the arcuate apertures 111, 112 and 113 into the pumping chamber 274. Since the fluid pressure internal to the pumping chamber 274 is now greater than the atmospheric pressure, the first and second flexible valve surfaces 254A and 254B of the output one way valve 252 separate from one another as shown in FIGS. 19 and 19A into the open position thus permitting the flow of liquid concentrate 30 from the pumping chamber 274 into the mixing chamber 230.

When the motive means including motor 54 reciprocates the output body portion 272 from the second position shown in FIGS. 19 and 19A to the first position shown in FIGS. 20 and 20A, the volume of the pumping chamber 274 again expands thereby reducing the pressure internal the pumping chamber 274 to close the output one way valve 252. The greater fluid pressure in the arcuate apertures 111, 112 and 113 opens the input one-way valve means 240 to permit the flow of liquid concentrate 30 from the arcuate apertures 111, 112 and 113 into the pumping chamber 274. Continued reciprocation of the output body portion 272 relative to the input body portion 271 between the first and the second position will continuously cause the liquid concentrate 30 to flow from the arcuate apertures 111, 112 and 113 of the container cap 21 through the pumping chamber 274 and into the mixing chamber 230 as heretofore described.

In a manner similar to FIGS. 15A, 16A and 17A, the mixing port 288 defined in the body member 270 resiliently receives the tubular member 86 of the pivot arm 68 for providing a fluid tight seal. The liquid concentrate 30 flowing through the output one way valve means 252 strikes the horizontal surface 257 and is deflected upwardly to mix with the liquid diluent 32 entering the mixing chamber 230 through the mixing port 288. The liquid diluent 32 entering the mixing chamber 23 and the upward deflection of the liquid concentrate 30 creates a turbulence for facilitating the mixing of the liquid concentrate 30 with the liquid diluent 32. Furthermore, the reciprocation of the mixing chamber 230 concurrently with the reciprocation of the output body member 272 between the first and the second position assists in the mixing of the liquid diluent 32 with the liquid concentrate 30.

The mixed liquid diluent 32 and liquid concentrate 30 enters the sectors including sectors 281 and 282 which modify the turbulent flow of the mixed liquid diluent 32 and liquid concentrate 30 into a substantially laminar flow from the terminal orifice 236.

Figures 21, 21A:
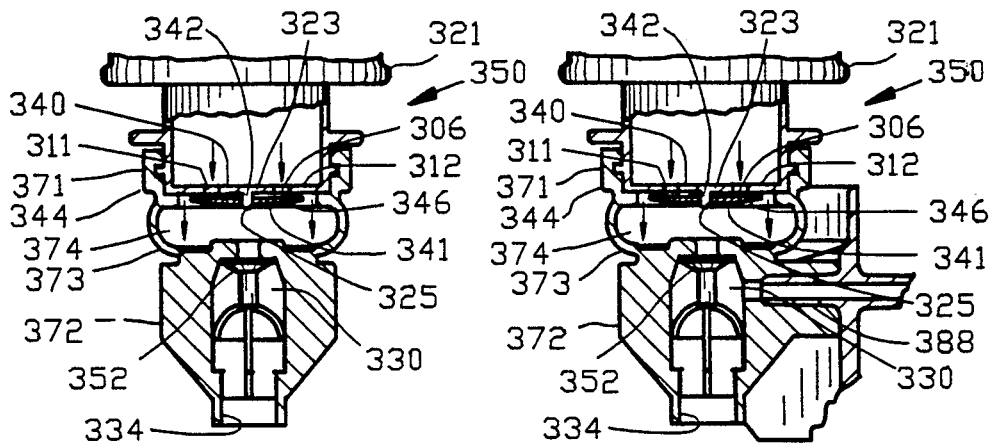
FIG. 21 is a front sectional of a third embodiment of the pump with the pump being shown in a first position.
FIG. 21A is an side sectional of FIG. 21.
Figures 22, 22A:
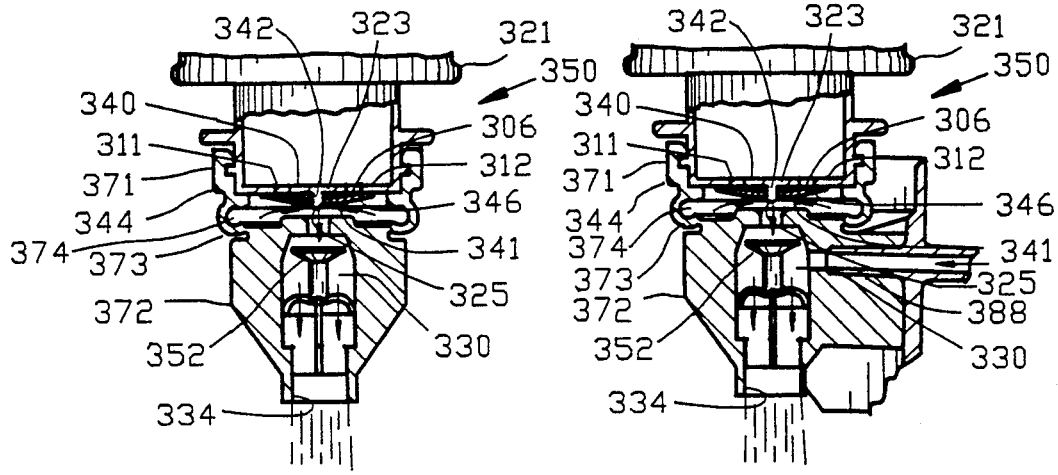
FIG. 22 is a front sectional view of the third embodiment of the pump with the pump being shown in a second position.
FIG. 22A is an side sectional of FIG. 22.
Figures 23, 23A:
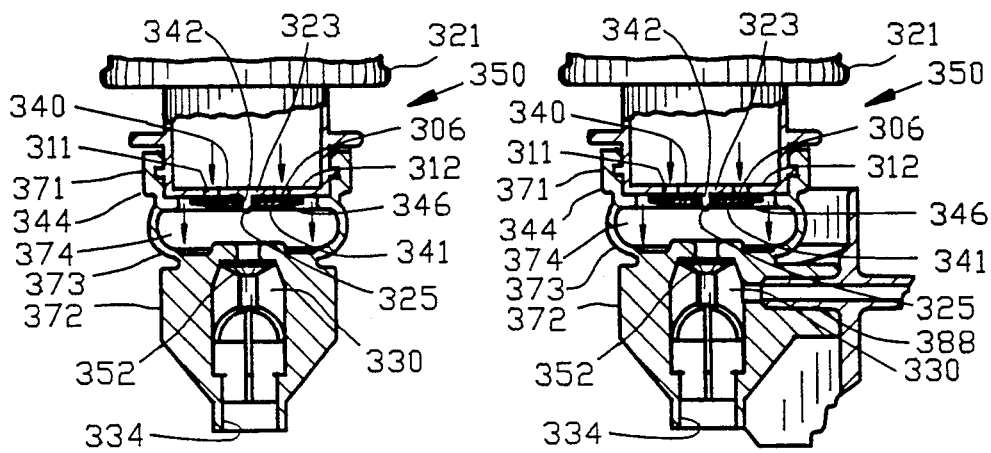
FIG. 23 is a front sectional view of the third embodiment of the pump with the pump being shown returned to the first position.
FIG. 23A is a side sectional of FIG. 23.

FIGS. 21 and 21A are sectional views of a third embodiment of the pumping and mixing device 350 with the pump and mixing device 350 being shown in a first position. FIGS. 22 and 22A illustrate the third embodiment of the pump and mixing device 350 in a second position whereas FIGS. 23 and 23A illustrate the third embodiment of the pump and mixing device 350 returned to the first position. In this embodiment, the output body portion 372 including the output one-way valve means 340 and the flexible wall 373 of the pumping and mixing device 350 are identical to the output body portion 72, the output one-way valve means 152 and the flexible wall 73 of the pumping and mixing device 50 illustrated in FIGS. 15-17. In addition, the output body portion 372 including the mixing chamber 330 and the terminal passage 334 are identical to the output body portion 72, the mixing chamber 130 and the terminal passage 134 of the pumping and mixing device 50 illustrated in FIGS. 15-17.

In this embodiment, the face surface 306 of the container cap 321 includes securing means shown as a shaft 323 having an enlarged head 325 extending from the container cap 321. The shaft 323 is disposed central the plural arcuate apertures 311, 312 and 313. The input one-way valve means 340 includes a saucer shaped resilient disk 341 having a central aperture 342 for securing to the shaft 323 extending from the container cap 321. The saucer shaped resilient disk 341 tapers in thickness from the central aperture 342 radially outward to have a thin periphery 344. When the saucer shaped resilient disk 341 is secured to the container cap 321, the saucer shaped disk 341 resiliently engages an overlaid portion 346 of the face surface 306 of the container cap 321 and overlays the plural arcuate apertures 311, 312 and 313.

When a fluid pressure in the arcuate apertures 311, 312 and 313 is greater than the fluid pressure in the pumping chamber 374, then the input one-way valve means 340 will flex downwardly in FIGS. 21 and 21A from the overlaid portion permitting the flow of concentrate 30 from the arcuate apertures 311, 312 and 313 into the pumping chamber 374. When a fluid pressure is less in the arcuate apertures 311, 312 and 313 than the fluid pressure in the pumping chamber 374, then the input one-way valve means 340 will remain in the overlaying position shown in FIG. 22 and prevent the flow of concentrate 30 from the arcuate apertures 311, 312 and 313 into the pumping chamber 374.

When the motive means including motor 54 reciprocates the output body portion 372 from the first position shown in FIGS. 21 and 21A into the second position shown in FIGS. 22 and 22A, the volume of the pumping chamber 374 contracts thereby increasing the pressure internal the pumping chamber 374 such that the input one-way valve means 340 will move into the overlaying position shown in FIGS. 22 and 22A thus closing input one-way valve means 340 and preventing the further flow of liquid concentrate 30 from the arcuate apertures 311, 312 and 313 into the pumping chamber 374. Since the fluid pressure internal the pumping chamber 374 is now greater than the atmospheric pressure, the output one way valve 352 is displaced from the overlaying position shown in FIGS. 21 and 21A into the open position shown in FIGS. 22 and 22A thus permitting the flow of liquid concentrate 30 from the pumping chamber 374 into the mixing chamber 330.

When the motive means including motor 54 reciprocates the output body portion 372 from the second position shown in FIGS. 22 and 22A to the first position shown in FIGS. 23 and 23A, the volume of the pumping chamber 374 again expands thereby reducing the pressure internal the pumping chamber 374 to close the output one way valve 352. The greater fluid pressure in the arcuate apertures 311, 312 and 313 opens the input one-way valve means 340 to permit the flow of liquid concentrate 30 from the arcuate apertures 311, 312 and 313 into the pumping chamber 374. Continued reciprocation the output body portion 372 relative to the input body portion 371 between the first and the second position will continuously cause the liquid concentrate 30 to flow from the arcuate apertures 311, 312 and 313 of the container cap 321 through the pumping chamber 374 and into the mixing chamber 330 as heretofore described.

FIGS. 21A, 22A and 23A further illustrate the mixing port 388 defined in the body member 370 for introducing the diluent liquid 32 into the mixing chamber 330. The mixing port 388 is identical to the mixing port 88 shown in FIGS. 15A, 16A and 17A.

Figure 26:
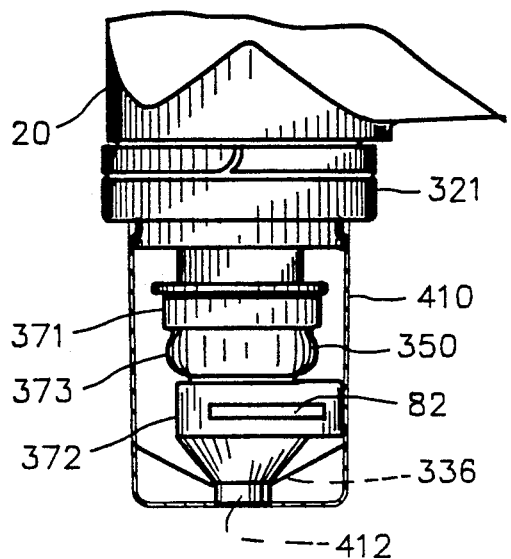
FIG. 26 is a partial sectional view of FIG. 25.
Figure 27:
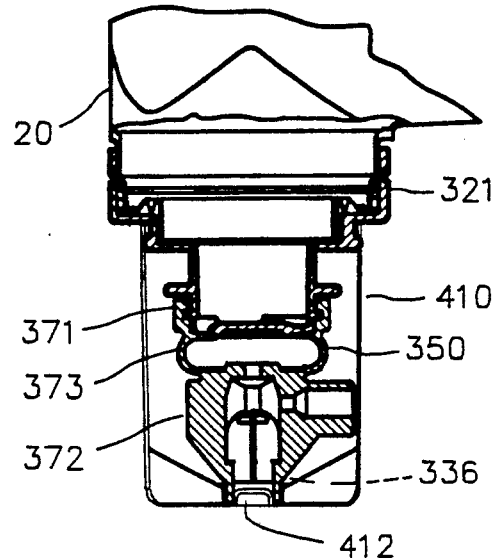
FIG. 27 is an enlarged sectional view of a portion of FIG. 25.

FIG. 24 is an exploded view of the third embodiment of the pump of FIGS. 21-23A and the container whereas FIG. 25 is an assembled view thereof. FIG. 26 is a partial sectional view of FIG. 25 whereas FIG. 27 is an enlarged sectional view of a portion of FIG. 25. A resilient gasket 400 is received within an opening 319 of the container 20 for seal the container cap 321 to the container 20. Preferably, the container cap 321 is sealed to the container 20 to prevent the unauthorized removal of the container cap 321. The seal between the container cap 321 and the container 20 prevents contamination and leakage of the concentrate 30 during shipment and storage as well prevent the removal of the container cap 321 from the container 20 by unauthorized persons. Accordingly, container cap 321 and the container 20 inhibit the refilling of the container 20 with liquid concentrate 30 thereby insuring the quality of the concentrate 30 internal the container 20. The container cap 321, the saucer shaped resilient disk 341 of the input one-way valve means 340 as well as the body member 370 and the output one-way valve means 340 as illustrate in the relative positions of assembly.

An overcap 410 removably engages with the container cap 321 for covering the pumping and mixing device 350 to prevent contamination during shipment and storage. The overcap 410 is secured to the container cap 321 in a snap locking engagement as will be described in greater detail with reference to FIG. 28. As shown in FIGS. 26 and 27, the overcap 410 includes a boss 412 extending from the inside of the overcap 410 for sealing with the terminal orifice 336 when the overcap 410 engages with the container cap 321. The seal between the boss 412 and the terminal orifice 336 prevents any leakage of the concentrate 30 during shipment and storage of the completed and filled assembly.

Preferably, the gasket 400, the container cap 321, the saucer shaped resilient disk 341, the body member 370 and the output one-way valve means 340 as well as the overcap 410 are assembled to form a subassembly 420. After the container 20 is filled with the liquid concentrate 30, the subassembly 420 is seal to the container 20 when the container cap 321 is sealed to the container 20.

Figure 28:
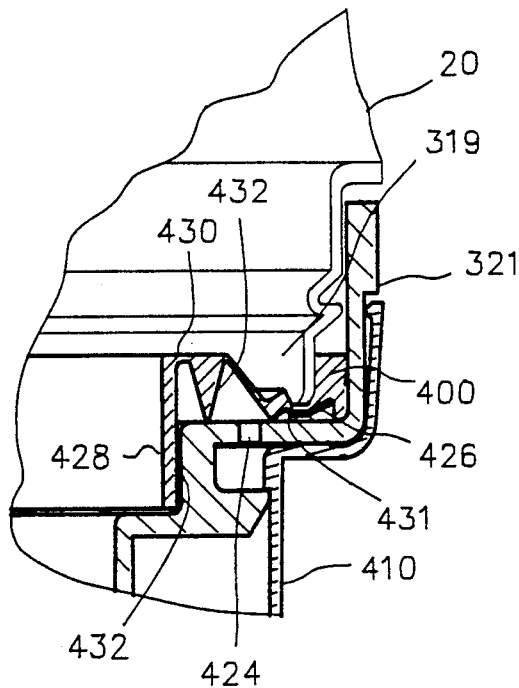
FIG. 28 is an enlarged sectional view of a portion of FIG. 25.

FIG. 28 is an enlarged sectional view of a portion of FIG. 25 further illustrating the seal created between the container cap 321 and the container 20. The overcap 410 includes a projection 421 for interlocking with a shoulder 422 of the container cap 321 for securing the overcap 410 to the container cap 321 in a snap locking engagement. The overcap 410 is secured to the container cap 321 outboard of a vent hole 424 to further prevent any leakage of the concentrate 30 during shipment and storage of the completed and filled assembly.

The resilient gasket 400 includes a sealing portion 426 for effecting a seal between the opening 319 in the container 20 and a first internal surface 431 of the container cap 321. The resilient gasket 400 also includes an integral annular wall portion 428 which is affixed to the sealing portion 426 by a web 430 and extends parallel to a second internal surface 432 of the container cap 321. The resilient gasket 400 includes a vent valve 434 which is interposed between the sealing portion 426 and the annular wall portion 428.

The container cap 321 includes a vent hole 424 for venting the container 20 as the concentrate 30 internal the container 20 is depleted during use of the pumping and mixing device 350. The vent hole 424 is located radially inward of the sealing portion 426 and radially outward of the vent valve 434 of the sealing gasket 400.

As the concentrate 30 internal the container 20 is depleted during use, the pressure internal the container 20 is reduced relative to the ambient pressure at the vent hole 424. As the differential in pressure increases, the vent valve 434 opens permitting the flow of air into the container 20 and to form an air pocket inboard of the vent valve 434 and between the annular wall portion 428 and the second internal surface 432. Continued depletion of the concentrate internal the container 20 causes the vent valve 434 to open permitting the flow of additional air into the container 20. If the pressure internal the container 20 is increases relative to the ambient pressure at the vent hole 424 caused by squeezing the container or a temperature imbalance or the like, the liquid concentrate internal the container will replace the volume of air in the air pocket prior to leaking from the vent hole 424. Accordingly, the air pocket created between the second internal surface 432 and the vent valve 434 inhibits the liquid concentrate 30 internal the container 20 from migrating or leaking from the vent hole 424.

In the dispensing machines of the prior art, 4.0 parts of liquid diluent were required for 1.0 part of liquid concentrate. The pumping and mixing device of the present invention has accurately and reliably pumped a liquid concentrate requiring 4.5 parts of diluent for 1.0 part of liquid concentrate. Although the pumping and mixing device of the present invention is capable of accurately and reliably pumping a liquid concentrate requiring 5.0 parts of diluent for 1.0 part of liquid concentrate, it has been found that the viscosity of the 5.0 liquid concentrate inhibits the normal migration of air bubbles therethrough thus inhibiting the venting of the container.

The dispensing device of the present invention provide a system which substantially advances the liquid dispensing art. The present invention reduces the number of parts required for a liquid dispensing machine of the type herein set forth. The improved pump and mixing device is inexpensive enabling the pumping and mixing device to be shipped with the container of the liquid concentrate and to be discarded after the liquid concentrate within the container has been depleted. Furthermore, the improved pumping and mixing device accurately and reliably pumps liquid concentrate irrespective of the viscosity of the liquid concentrate. The pumping and mixing device is coupled with mechanical motive as well as being fluidly coupled to the liquid diluent concurrently with the insertion of the container within a refrigerated compartment of the dispensing device. The concentrate container and the pumping and mixing device are sealed to prevent contamination and leakage of the concentrate during shipment and storage as well as being adapted to inhibit the refilling of the container with liquid concentrate thereby insuring the quality of the concentrate internal to the container.

FIGS. 29-33 illustrate an improved one-way valve 552 which comprises a fourth embodiment of the invention. The improved one-way valve 552 comprises a base 596, a valve surface 554 and a flexible web 557 interposed between and integrally formed with the base 596 and the valve surface 554. The base 596 comprises a first and a second cross-member 558 and 559 and a shaft 556. The cross-members 558 and 559 are planar and intersect perpendicular to one another thereby defining a plurality of sectors 581-584. The cross-member 558 has ledges 558A and 558B and curved leading edges 558C and 558D whereas the cross-member 559 has ledges 559A and 559B and curved leading edges 559C-559D. The shaft 556 has a first end 501 and a second end 502 and is integrally formed with and is supported by the first and second cross-members 558 and 559 at the second end 502. The shaft 556 is tapered at the first end 501 and defines an axis 556A of the shaft 556 that is coincident with the intersection of the cross-members 558 and 559.

The valve surface 554 comprises a resilient truncated conical member 590 having a first conical end 591 and a second conical end 592. A substantially rigid annular member 594 is secured to the second conical end 592 of the resilient truncated conical member 590.

The flexible web 557 is integrally formed with the first end 501 of the shaft 556. The tapering of the shaft 556 at the first end 501 reduces surface contact between the shaft 556 and the flexible web 557 to increase the surface area of the flexible web 557 thereby increasing the flexibility of the flexible web 557.

Preferably, the improved one-way valve 552 including the valve surface 554, the shaft 556, the flexible web 557 and the cross-members 558 and 559 are integrally molded from a polymeric material such as resilient thermoplastic polymer or other suitable material.

Figure 34:
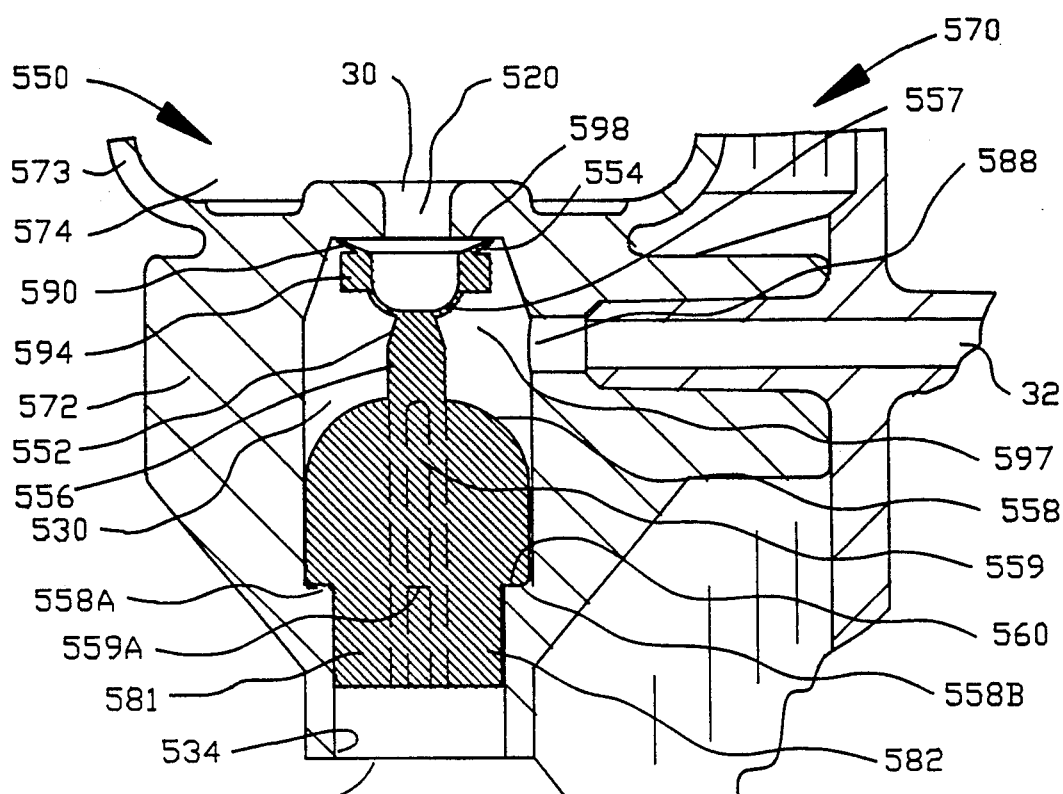
FIG. 34 is a side sectional view of a fourth embodiment of a pump incorporating the improved one-way valve of FIGS. 29-33 in a biased and extended position.
Figure 35:
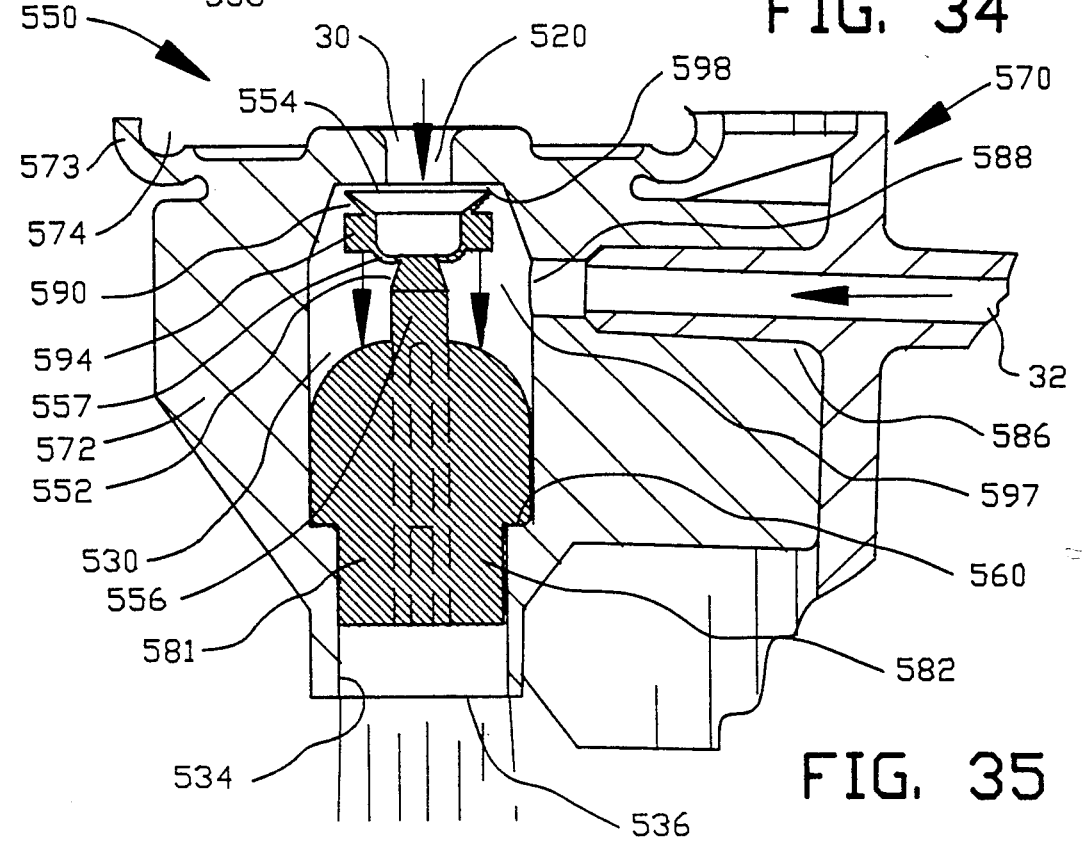
FIG. 35 is a sectional view similar to FIG. 34 illustrating the improved one-way valve in a retracted position.

FIGS. 34 and 35 are sectional views of the improved one-way valve 552 disposed within a pump and mixing device 550. The pump and mixing device 550 of FIGS. 34 and 35 operates in a manner similar to the pump and mixing device 50 of FIGS. 15A and 16A. An input body portion (not shown) including an input one-way valve means (not shown) and the flexible wall 573 of the pumping and mixing device 550 are identical to the input body portion 71, the input one-way valve means 140 and the flexible wall 73 of the pumping and mixing device 50 illustrated in FIGS. 15A and 16A. In addition, the output body portion 572 including the mixing chamber 530 and the terminal passage 534 are identical to the output body portion 72, the mixing chamber 130 and the terminal passage 134 of the pumping and mixing device 50 illustrated in FIGS. 15A and 16A.

The improved one-way valve 552 is mounted in a mixing chamber 530. The output aperture 120 of the pumping chamber 274 of FIGS. 15A and 16A forms a mixing chamber input aperture 520. A sealing surface 598 is disposed about the mixing chamber input aperture 520 with a terminal orifice 536 being axially aligned with the mixing chamber input aperture 520. A mixing liquid port 588 is defined in the mixing chamber 530 to enter into a mixing area 597 defined between the annular member 594 and cross-members 558 and 559. The mixing liquid port 588 is disposed perpendicular to the axial alignment of the mixing chamber input aperture 520 and the terminal orifice 536.

The base 596 is mounted in mixing chamber 530 with the ledges 558A, 558B, 559A and 559B of the cross-members 558 and 559 engaging a shoulder 560 defined in the mixing chamber 530 to support the base 596 within the mixing chamber 530. The cross-members 558 and 559 are resiliently flexible for resiliently engaging with the mixing chamber 530 to secure the one-way valve 552 therein. The resilience of the cross-members 558 and 559 also facilitate the insertion and the removal of the one-way valve 552 from the mixing chamber 530. The cross-members 558 and 559 and the terminal passage 534 define sectors 581-584.

The shaft 556 is located in the mixing chamber 530 by the cross-members 558 and 559 to support the flexible web 557 relative to the base 596. The flexible web 557 resiliently biases the valve surface 554 into engagement with the sealing surface 598 for closing the mixing chamber input aperture 520 to ensure a fluid-tight seal between resilient truncated conical member 590 and sealing surface 598 of the mixing chamber 530 as shown in FIG. 34. The biasing of the flexible web 557 causes a radial outwardly deformation of the resilient truncated conical member 590 to enhance the seal with the sealing surface 598.

FIGS. 34 and 35 show the operation of the improved one-way valve 552 within the pump and mixing device 550 between a first and second position, respectively. The improved one-way valve 552 cooperates with the mixing chamber input aperture 520 for permitting the flow of the liquid concentrate 30 in only one direction from the pumping chamber 574 through the mixing chamber input aperture 520 into the mixing chamber 530 for discharge from the terminal orifice 536.

As previously described, the motor 54 reciprocates the output body portion 572 relative to the input body portion (not shown) between the first and the second position shown in FIGS. 34 and 35, respectively. When the output body portion 572 moves from the second position shown in FIG. 35 to the first position shown in FIG. 34, the fluid pressure internal the pumping chamber 574 is below the fluid pressure in the mixing chamber 530. The resilient bias of the flexible web 557 resiliently biases the resilient truncated conical member 590 into engagement with the sealing surface 598 for the closing the mixing chamber input aperture 520, as shown in FIG. 34, to prevent a flow of the liquid concentrate 30 from the mixing chamber 530 to the pumping chamber 574. The resilient truncated conical member 590 engages with the sealing surface 598 to close the mixing chamber input aperture 520 for inhibiting the flow of the liquid concentrate 30 in a direction opposed from the mixing chamber 530 through the mixing chamber input aperture 520 into the pumping chamber 574.

When the motive means including motor 54 reciprocates the output body portion 572 from the first position shown in FIG. 34 into the second position shown in FIG. 35, the fluid pressure in the pumping chamber 574 becomes sufficiently greater than the fluid pressure in the mixing chamber 530 to exceed the resilient bias of the flexible web 557, the flexible web 557 flexes downwardly. The resilient truncated conical member 590 and substantially rigid annular member 594 move downwardly in unison upon the flexing of flexible web 557 for moving the valve surface 554 from a closed position as shown in FIG. 34 to an open position as shown in FIG. 35. The resilient truncated conical member 590 is displaced from engagement with the sealing surface 598 to open the mixing chamber input aperture 520 for permitting the flow of the liquid concentrate 30 from the pumping chamber 574 through the mixing chamber input aperture 520 into the mixing chamber 530.

FIGS. 34 and 35 further illustrate the mixing port 588 defined in the body member 570 for introducing the diluent liquid 32 into the mixing chamber 530. The liquid diluent 32 enters the mixing chamber 530 under pressure at a right angle to the flow of the liquid concentrate 30 and proximate to the shaft 556 causing a turbulence for facilitating the mixing of the liquid concentrate 30 with the liquid diluent 32. Furthermore, the reciprocation of the mixing chamber 530 concurrently with the reciprocation of the output body member 572 between the first and the second position assists in the mixing of the liquid diluent 32 with the liquid concentrate 30. In addition, as the fluid pressure in the pumping chamber 574 alternates above and below the pressure necessary to operate the valve surface 554, the valve surface 554 reciprocates between the closed position and the open position, further facilitating the mixing of liquid diluent 32 with liquid concentrate 30. The liquid concentrate 30 and liquid diluent 32 are turbulently mixed in the mixing area 597 of the mixing chamber 530.

Fluid pressure from the pumping chamber 574 propels the liquid concentrate 30 into the mixing area 597 of the mixing chamber 530. The liquid concentrate 30 and liquid diluent 32 encounter and flow past the leading edge 558C-558D and 559C-559D of the cross-members 558 and 559 into the sectors 581-584. The sectors 581-584 modify the turbulent flow of the liquid diluent 32 and liquid concentrate 30 into a substantially laminar flow, which is discharged from the terminal orifice 536.

Figure 36:
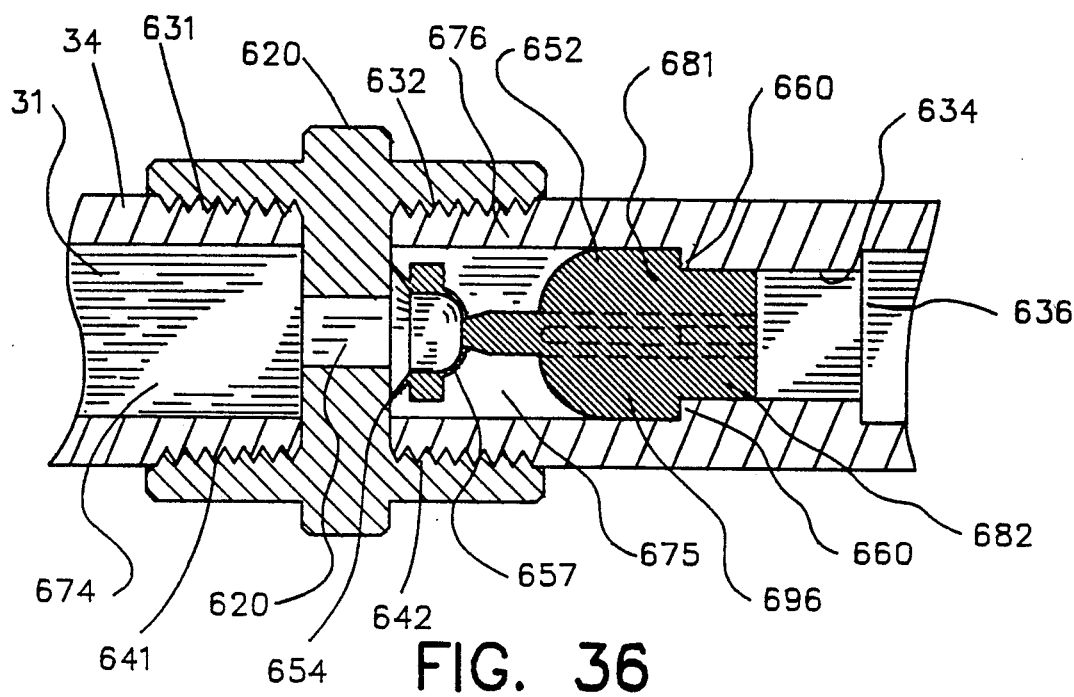
FIG. 36 is a sectional view of the improved one-way valve located in a conduit with the one-way valve in a biased and closed position.
Figure 37:
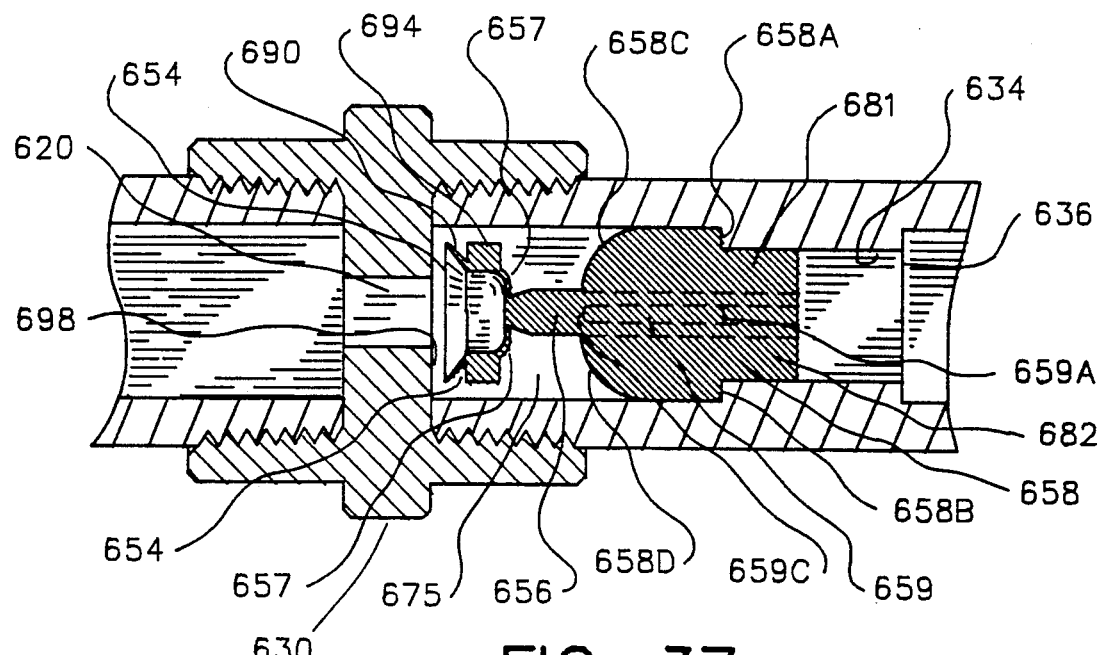
FIG. 37 is a sectional view similar to FIG. 36 with the one-way valve in an open position.

FIGS. 36 and 37 illustrate an improved one-way valve 652 being used as a check valve in a fluid line 676 between an upstream chamber 674 and a downstream chamber 675. A fitting 630 comprises threads 631 and 632 for threadably engaging with threaded ends 641 and 642 of a first and a second conduit section 34A and 34B. The fitting 630 enables the insertion and the removal of the one-way valve 652 from the downstream chamber 674. The improved one-way valve 652 is mounted in the downstream chamber 675 with an input aperture 620 being defined i the fitting 630 between the upstream chamber 674 and the downstream chamber 675. A sealing surface 698 is disposed about the input aperture 620. The downstream chamber 675 also has a terminal orifice 636 axially aligned with the input aperture 620.

The base 696 is mounted in the downstream chamber 675 with ledges 658A-658B and 659A-659B of the cross-members 658 and 659 engaging a shoulder 660 defined in the downstream chamber 675 to retain the cross-members 658 and 659 within the downstream chamber 675. The cross-members 658 and 659 are resiliently flexible for resiliently engaging with the downstream chamber 675 to secure the one-way vale 652 therein. The resilience of the cross-members 658 and 659 also facilitate the insertion and the removal of the one-way valve 652 from the downstream chamber 675. The cross-members 658 and 659 along with the terminal passage 634 define sectors 681-684. A shaft 656 is supported in the downstream chamber 675 by the cross-members 658 and 659 for supporting the flexible web 657 on the base 696. The flexible web 657 resiliently biases the valve surface 654 into engagement with the sealing surface 698 thereby closing the input aperture 620 to ensure a fluid-tight seal between the resilient truncated conical member 690 and the sealing surface 698 of the downstream chamber 675.

In the same manner as described previously, when the fluid pressure in the upstream chamber 674 is not sufficiently greater than the fluid pressure in the downstream chamber 675 so as to exceed the resilient bias of the flexible web 657, the flexible web 657 resiliently biases the resilient truncated conical member 690 into engagement with the sealing surface 698 to close the input aperture 620, as shown in FIG. 36.

When a fluid pressure in the upstream chamber 674 becomes sufficiently greater than the fluid pressure in the downstream chamber 675 to exceed the resilient bias of the flexible web 657, the flexible web 657 enables the resilient truncated conical member 690 and substantially rigid annular member 694 to move away from the input aperture 620. The flexing of the flexible web 657 moves the valve surface 654 from the closed position as shown in FIG. 36 to an open position as shown in FIG. 37. The resilient truncated conical member 690 is displaced from engagement with the sealing surface 698 for opening the input aperture 620 to permit the flow of the liquid 31 in a forward direction from the upstream chamber 674 through the input aperture 620 into the downstream chamber 675. Fluid pressure from the upstream chamber 674 propels the liquid 31 from the downstream chamber 675 toward terminal orifice 636. The liquid 31 encounters and flows past the leading edges 658C-658D and 659C-659D of the cross-members 658 and 659 through the sectors 681-684 and is discharged into the downstream chamber 675.

When a fluid pressure in the upstream chamber 674 is not sufficiently greater than the fluid pressure in the downstream chamber 675 to exceed the resilient bias of the flexible web 657, the flexible web 657 flexes toward the aperture 620. The resilient truncated conical member 690 and the substantially rigid annular member 694 move toward the input aperture 620 in unison upon the flexing of the flexible web 657 for moving the valve surface 654 from the open position as shown in FIG. 37 to the closed position as shown in FIG. 36. The resilient truncated conical member 690 engages with sealing surface 698 for closing the input aperture 620 to inhibit the flow of fluid 30 in a direction from the downstream chamber 675 through the input aperture 620 into the upstream chamber 674.

This embodiment illustrates improved one-way valve 652 is driven by fluid pressure, which is not necessarily alternating as in reciprocating pump embodiments shown above. Once fluid pressure surpasses a certain level, the input aperture 620 remains open and allows for the continuous flow of the liquid 31 in a forward direction so long as fluid pressure remains sufficient to overcome the resilient bias of flexible web 657.

This improved one-way valve 652 has many applications including a check valve in a fluid line to prevent the backflow of a fluid in a fluid line. When the fluid pressure is not sufficient to overcome the resilient bias, the improved one-way valve 652 closes to act as a check valve for inhibiting the flow of liquid 31 in reverse direction.

FIG. 4 illustrates the improved one-way valve 652 being interposed in the flexible conduit 34 between the first and the second conduit sections 34A and 34B. The improved one-way valve 652 interposed in the flexible conduit 34 prevents the backflow of liquid diluent 32 or other contaminants into the first conduit section 34A of the flexible conduit 34.

The improved one-way valve of the present invention provides improved operation of the dispensing device set forth in our U.S. Pat. No. 5,114,047. The present invention provides an improved one-way valve for a pump and mixing device for pumping a liquid concentrate from a container into a mixing chamber and for mixing the concentrate with a diluent wherein the improved one-way valve enhances the ability of the pump to accurately and reliably pump liquid concentrate irrespective of the viscosity of the liquid concentrate, and enhances the pump and mixing device as a reliable and inexpensive unit enabling the pump and mixing device to be discarded after the liquid concentrate within the container is depleted. The improved one-way valve cooperates with the pump and mixing device to provide a one-way valve for enabling the flow of the liquid concentrate only from the pump into the mixing chamber. Furthermore, the improved one-way valve facilitates mixing in the pump and mixing device.

The improved one-way valve, when inserted in a fluid line having an intake aperture, cooperates with the intake aperture for enabling the flow of the fluid in only one direction through the fluid line. The improved one-way valve thus reliably and inexpensively prevents the backflow of liquid in the fluid line. The improved one-way valve is an integrally molded one-piece unit constructed of polymeric material such as silicone for improved flexibility and sanitary operation.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved one-way valve apparatus, comprising:
   a chamber having an input aperture and an output aperture;
   a sealing surface disposed about said input aperture of said chamber;
   a base for mounting in said chamber;
   said base defining a plurality of sectors between said base and said chamber for enabling the flow of fluid through said plurality of sectors;
   a substantially rigid annular member;
   a valve surface secured to said substantially rigid annular member for engaging with said sealing surface to close said input aperture;
   a flexible web interposed between said base and said substantially rigid annular member for resiliently biasing said valve surface into engagement with said sealing surface for closing said input aperture;
   said valve surface being displaced from said sealing surface for opening said input aperture upon a fluid pressure from said input aperture for permitting the flow of the fluid from said input aperture through said chamber into said output aperture;

said valve surface engaging with said sealing surface disposed about said input aperture for closing said input aperture when a fluid pressure within said chamber is less than the fluid pressure from said input aperture for inhibiting the flow of fluid from said chamber into said input aperture; and said flexible web being integrally formed with said base and being integrally formed with said substantially rigid annular member for enabling the insertion and the removal of the improved one-way valve from said chamber as a one-piece unit.

2. An improved one-way valve apparatus as set forth in claim 1, wherein said base comprises a first and a second cross-member for supporting said base within said chamber; and said first and second cross-member defining said plurality of sectors therebetween for enabling the flow of fluid through said plurality of sectors.

3. An improved one-way valve apparatus as set forth in claim 1, wherein said base comprises a first and a second cross-member for supporting said base within said chamber;

said first and second cross-members defining said plurality of sectors therebetween for enabling the flow of fluid through said plurality of sectors; and a shaft integrally formed with said first and said second cross-members for supporting said flexible web on said base.

4. An improved one-way valve apparatus as set forth in claim 1, wherein said flexible web is integrally molded with said base.

5. An improved one-way valve as set forth in claim 1, wherein said base comprises a first and a second cross-member for supporting said base within said chamber;

said first and second cross-members defining said plurality of sectors therebetween for enabling the flow of fluid through said plurality of sectors; and said plurality of sectors converting the flow of the liquid from said input aperture into said chamber into a substantially laminar flow upon discharge from said output aperture.

6. An improved one-way valve apparatus comprising:
a chamber having an input aperture and an output aperture;
a sealing surface disposed about said input aperture of said chamber;
a base for mounting in said chamber;
a valve surface for engaging with said sealing surface to close said input aperture;
a flexible web interposed between said base and said valve surface for resiliently biasing said valve surface into engagement with said sealing surface for closing said input aperture;
said valve surface being displaced from said sealing surface for opening said input aperture upon a fluid flow from said input aperture for permitting the flow of the fluid from said input aperture through said chamber into said output aperture;
said valve surface engaging with said sealing surface disposed about said input aperture for closing said input aperture when a flow of fluid from said chamber is less than the fluid flow from said input aperture for inhibiting the flow of fluid from said chamber into said input aperture;
said valve surface comprising a first conical end of a resilient truncated conical member;
a substantially rigid annular member; and said resilient truncated conical member having a second conical end of said resilient truncated conical member secured to said substantially rigid annular member.

7. An improved one-way valve apparatus comprising:
a chamber having an input aperture and an output aperture;
a sealing surface disposed about said input aperture of said chamber;
a base for mounting in said chamber;
a valve surface for engaging with said sealing surface to close said input aperture;
a flexible web interposed between said base and said valve surface for resiliently biasing said valve surface into engagement with said sealing surface for closing said input aperture;
said valve surface being displaced from said sealing surface for opening said input aperture upon a fluid flow from said input aperture for permitting the flow of the fluid from said input aperture through said chamber into said output aperture;
said valve surface engaging with said sealing surface disposed about said input aperture for closing said input aperture when a flow of fluid from said chamber is less than the fluid flow from said input aperture for inhibiting the flow of fluid from said chamber into said input aperture;
said valve surface comprising a first conical end of a resilient truncated conical member;
a substantially rigid annular member;
said resilient truncated conical member having a second conical end of said resilient truncated conical member secured to said substantially rigid annular member; said
said flexible web being secured to said annular member for enabling said resilient truncated conical member and said substantially rigid annular member to move in unison upon the flexing of said flexible web.

8. An improved one-way valve apparatus as set forth in claim 7, wherein said resilient truncated conical member is integrally molded with said flexible web.

9. An improved one-way valve apparatus comprising:
a chamber having an input aperture and an output aperture;
a sealing surface disposed about said input aperture of said chamber;
a base for mounting in said chamber;
a valve surface for engaging with said sealing surface to close said input aperture;
a flexible web interposed between said base and said valve surface for resiliently biasing said valve surface into engagement with said sealing surface for closing said input aperture;
said valve surface being displaced from said sealing surface for opening said input aperture upon a fluid flow from said input aperture for permitting the flow of the fluid from said input aperture through said chamber into said output aperture;
said valve surface engaging with said sealing surface disposed about said input aperture for closing said input aperture when a flow of fluid from said chamber is less than the fluid flow from said input aperture for inhibiting the flow of fluid from said chamber into said input aperture;
said valve surface comprising a first conical end of a resilient truncated conical member;
a substantially rigid annular member;

said resilient truncated conical member having a second conical end of said resilient truncated conical member secured to said substantially rigid annular member;

said flexible web being secured to said annular member for enabling said resilient truncated conical member and said substantially rigid annular member to move in unison upon the flexing of said flexible web;

said base comprising a first and a second cross-member for supporting said base within said chamber;

said first and second cross-member defining said plurality of sectors therebetween for enabling the flow of fluid through said plurality of sectors; and a shaft integrally formed with said first and said second cross-members for supporting said flexible web on said base.

10. An improved one-way valve apparatus for mixing a liquid with a liquid diluent, comprising:

a mixing chamber having an input aperture and an output aperture with a sealing surface disposed about said input aperture;

a diluent port defined in said mixing chamber and interposed between said input aperture and said output aperture;

a base mounted in the chamber with a shaft integrally formed therewith;

a valve surface for engaging with said sealing surface to close said input aperture;

a flexible web interposed between said shaft and said valve surface for resiliently biasing said valve surface into engagement with said sealing surface for closing said input aperture;

the liquid being introduced into said mixing chamber through said input aperture;

said valve surface being displaced from said sealing surface for opening said input aperture when the liquid enters from said input aperture for permitting the flow of the liquid from said input aperture into said mixing chamber;

the liquid diluent being introduced into said mixing chamber through said diluent port;

said valve surface engaging with said sealing surface disposed about said input aperture for closing said input aperture when the liquid diluent enters said mixing chamber for inhibiting the flow of liquid diluent from said mixing chamber into said input aperture; and the liquid entering said input aperture mixing with the liquid diluent being introduced through said diluent port for discharge from said output aperture.

11. An improved one-way valve apparatus as set forth in claim 10, wherein said base comprises a first and a second cross-member for supporting said base with the chamber; and said first and second cross-members defining a plurality of sectors therebetween for enabling the flow of fluid through said plurality of sectors.

12. An improved one-way valve apparatus as set forth in claim 10, wherein said base comprises a first and a second cross-member for supporting said base with the chamber; and said first and second cross-members defining a plurality of sectors therebetween for enabling the flow of fluid through said plurality of sectors; and said shaft integrally formed with said first and second cross-members for supporting said flexible web on said base.

13. An improved one-way valve apparatus as set forth in claim 10, wherein said valve surface comprises a first conical end of a resilient truncated conical member;

a substantially rigid annular member; and said resilient truncated conical member having a second conical end of said resilient truncated conical member secured to said substantially rigid annular member.

14. An improved one-way valve apparatus as set forth in claim 10, wherein said valve surface comprises a first conical end of a resilient truncated conical member;

a substantially rigid annular member;

said resilient truncated conical member having a second conical end of said resilient truncated conical member secured to said substantially rigid annular member; and said flexible web being secured to said annular member for enabling said resilient truncated conical member and said substantially rigid annular member to move in unison upon the flexing of said flexible web.

15. An improved one-way valve apparatus as set forth in claim 14, wherein said resilient truncated conical member is integrally molded with said flexible web.

16. An improved one-way valve apparatus as set forth in claim 10, wherein said valve surface comprises a first conical end of a resilient truncated conical member;

a substantially rigid annular member;

said resilient truncated conical member having a second conical end of said resilient truncated conical member secured to said substantially rigid annular member;

said flexible web being secured to said annular memb resilient truncated conical member and said substantially rigid annular member to move in unison upon the flexing of said flexible web;

said base comprising a first and a second cross-member for supporting said base within the chamber;

said first and second cross-members defining a plurality of sectors therebetween for enabling the flow of fluid through said plurality of sectors; and said shaft integrally formed with said first and a second cross-members for supporting said flexible web on said base.

17. An improved one-way valve apparatus as set forth in claim 10, wherein said flexible web in integrally molded with said base.

18. An improved one-way valve apparatus as set forth in claim 10, wherein said input aperture is axially aligned with said output aperture; and said diluent port is perpendicular to said axial aligned input and output apertures for enabling the liquid diluent to flow in a direction perpendicular to the flow direction of the liquid for mixing the liquid diluent with the liquid.

19. An improved one-way valve apparatus as set forth in claim 10, wherein said base comprises a first and a second cross-member for supporting said base within the chamber;

said first and second cross-members defining a plurality of sectors therebetween for enabling the flow of fluid through said plurality of sectors; and said plurality of sectors converting the flow of the liquid from the input aperture and the flow of the liquid diluent from said diluent port into the chamber into a substantially laminar flow upon discharge from the output aperture.

* * * * *